(12) United States Patent
White et al.

(10) Patent No.: US 11,204,070 B2
(45) Date of Patent: Dec. 21, 2021

(54) BRAKE COMPONENT POSITIONING ASSEMBLY

(71) Applicant: Hendrickson USA, L.L.C., Schaumburg, IL (US)

(72) Inventors: Jay D. White, North Canton, OH (US); Jeffrey R. Wittlinger, Uniontown, OH (US); Dhawal P. Dharaiya, Twinsburg, OH (US); Matthew P. Karich, Fairlawn, OH (US)

(73) Assignee: Hendrickson USA, L.L.C., Schaumburg, IL (US)

( * ) Notice: Subject to any disclaimer, the term of this patent is extended or adjusted under 35 U.S.C. 154(b) by 329 days.

(21) Appl. No.: 15/980,863

(22) Filed: May 16, 2018

(65) Prior Publication Data

US 2018/0347652 A1 Dec. 6, 2018

Related U.S. Application Data

(60) Provisional application No. 62/513,548, filed on Jun. 1, 2017.

(51) Int. Cl.
*F16D 65/00* (2006.01)
*F16D 55/00* (2006.01)
*F16D 55/226* (2006.01)

(52) U.S. Cl.
CPC ..... *F16D 65/0056* (2013.01); *F16D 65/0043* (2013.01); *F16D 55/226* (2013.01); *F16D 2055/0008* (2013.01)

(58) Field of Classification Search
CPC ............. F16D 65/0043; F16D 65/0056; F16D 55/226; F16D 2055/0008; F16D 9/53; F16D 9/12; F16D 9/535
See application file for complete search history.

(56) References Cited

U.S. PATENT DOCUMENTS 3,081,843 A * 3/1963 Dotto .................... F16D 55/227
188/73.34
3,610,380 A * 10/1971 Montalvo, III ....... F16D 25/126
192/85.34

(Continued)

FOREIGN PATENT DOCUMENTS

| DE | 2457939 A1 | 6/1976 |
| DE | 102005052951 A1 | 5/2007 |
| WO | WO-2017000040 A1 * | 1/2017 ......... F16D 65/0043 |

*Primary Examiner* — Robert A. Siconolfi
*Assistant Examiner* — James K Hsiao
(74) *Attorney, Agent, or Firm* — Dureska & Moore, LLC; David P. Dureska; David J. Danko

(57) ABSTRACT

A brake component positioning assembly that is removably connectable to a component of a heavy-duty vehicle. The brake component positioning assembly enables a brake system component to be positioned away from a wheel end of the heavy-duty vehicle to allow removal or servicing of at least one component of a wheel end assembly or the vehicle brake system. In one embodiment, the brake component positioning assembly includes a base block disposed in a cutout of a torque plate. A positioning block slidably engages one or more guide pins received by or disposed through the base block. A positioning bolt threadably engages the positioning block, whereby upon rotation of the positioning bolt, the positioning block and brake system component are positioned away from the bottom block and wheel end. Components of the brake component positioning assembly can be removably connected to each other.

23 Claims, 11 Drawing Sheets

(56) References Cited

U.S. PATENT DOCUMENTS

| | | | |
|---|---|---|---|
| 4,111,285 A * | 9/1978 | Honick | F16D 55/22655 188/73.34 |
| 4,239,196 A | 12/1980 | Hanger | |
| 4,352,414 A * | 10/1982 | Scott | F16D 55/227 188/73.34 |
| 4,823,920 A * | 4/1989 | Evans | F16D 65/0971 188/73.34 |
| 4,908,925 A * | 3/1990 | Johnson | B25B 27/023 29/244 |
| 5,077,886 A * | 1/1992 | Hashimoto | B23P 19/04 29/434 |
| 5,462,250 A * | 10/1995 | Fells | B60T 17/221 248/349.1 |
| 5,895,030 A * | 4/1999 | Mohun | B60B 29/002 254/7 R |
| 5,966,812 A * | 10/1999 | Shiets | B23P 6/00 29/402.09 |
| 6,032,768 A * | 3/2000 | Ebbinghaus | B60B 27/001 188/73.31 |
| 6,068,091 A * | 5/2000 | Finley | B60T 1/065 188/58 |
| 6,925,696 B1 * | 8/2005 | Williams | B25B 27/026 29/252 |
| 6,926,122 B2 * | 8/2005 | Wittlinger | B60B 35/006 188/18 A |
| 7,216,409 B1 * | 5/2007 | Chiu | B25B 27/023 29/255 |
| 7,322,087 B1 * | 1/2008 | Hu | B25B 27/023 29/255 |
| 8,146,223 B2 * | 4/2012 | Ebert | F16D 65/0043 29/281.1 |
| 8,347,474 B2 * | 1/2013 | Oachs | B25B 27/023 29/259 |
| 8,397,885 B2 * | 3/2013 | Shiao | F16F 9/12 188/267.2 |
| 9,377,067 B2 * | 6/2016 | Mellberg | F16D 65/0043 |
| 9,771,990 B2 * | 9/2017 | Slee | B66F 9/18 |
| 10,746,240 B2 * | 8/2020 | James | F16D 65/0043 |
| 2005/0081355 A1 * | 4/2005 | Nechvatal | B25B 11/02 29/426.5 |
| 2006/0170279 A1 * | 8/2006 | Ebert | B23P 6/00 301/130 |
| 2007/0144842 A1 * | 6/2007 | Zhou | F16F 9/535 188/267 |
| 2009/0158570 A1 * | 6/2009 | Morey | B66F 3/36 29/252 |
| 2010/0018814 A1 * | 1/2010 | Pagles | F16D 65/0043 188/18 A |
| 2011/0179616 A1 * | 7/2011 | Oachs | B25B 27/023 29/259 |
| 2012/0211315 A1 * | 8/2012 | Shiao | F16F 9/12 188/267.2 |
| 2014/0152066 A1 * | 6/2014 | Hiemenz | F16F 9/12 297/344.1 |
| 2015/0096849 A1 * | 4/2015 | Plantan | F16D 65/0056 188/73.46 |
| 2015/0198208 A1 * | 7/2015 | Mellberg | F16D 65/0043 294/67.1 |
| 2015/0345134 A1 * | 12/2015 | Takahashi | F16F 15/027 52/167.2 |
| 2015/0369309 A1 * | 12/2015 | Slee | F16D 65/0043 269/17 |
| 2017/0067519 A1 * | 3/2017 | Woods | F16D 65/0043 |
| 2017/0211639 A1 * | 7/2017 | Drewes | F16D 51/10 |
| 2017/0248181 A1 * | 8/2017 | Wang | B25B 27/062 |
| 2018/0142744 A1 * | 5/2018 | Krause | F16D 65/092 |
| 2018/0180118 A1 * | 6/2018 | James | B25B 11/02 |
| 2018/0335097 A1 * | 11/2018 | Dahl | B25B 27/0035 |
| 2019/0056001 A1 * | 2/2019 | Dillon | F16D 65/0056 |
| 2019/0225352 A1 * | 7/2019 | Martin | B64F 5/40 |

* cited by examiner

BRAKE COMPONENT POSITIONING ASSEMBLY

CROSS-REFERENCE TO RELATED APPLICATION

This application claims the benefit of U.S. Provisional Patent Application Ser. No. 62/513,548, filed Jun. 1, 2017.

BACKGROUND

Technical Field

The disclosed subject matter relates to disc brake systems for heavy-duty vehicles. More particularly, the disclosed subject matter relates to a structure for positioning brake system components away from a heavy-duty vehicle wheel end. Still more particularly, the disclosed subject matter is directed to a brake component positioning structure or assembly removably connected to a heavy-duty vehicle wheel end or other heavy-duty vehicle component. The brake component positioning assembly allows a caliper and associated brake components of a vehicle brake system to be moved away from the wheel end assembly to facilitate servicing and/or removal of the wheel hub, rotor, and/or guide pin bushings or other components of the caliper, without requiring removal of the air hose from the actuator and manual removal of the caliper and associated brake assembly components from the wheel end. The brake component positioning assembly eliminates the need to use a discrete crane for such servicing and/or removal, thereby providing a more service friendly mechanism for servicing and/or removing components of the wheel end assembly and/or caliper. In addition, the brake component positioning assembly minimizes the potential for contaminants to be introduced into the brake air hoses during servicing and/or removal of the components. The brake component positioning assembly also facilitates alignment of the caliper guide pins with the carrier or torque plate during reattachment of the caliper to the carrier or torque plate after servicing and/or reattachment of the wheel hub, rotor, and/or caliper guide pin bushings.

Background Art

Disc air brake systems for vehicles are well known in the brake art. Such systems operate by forcing a pair of opposing brake pads against a rotor, thereby creating friction between the pads and the rotor to slow and/or stop the vehicle. More particularly, a disc air brake system includes a plurality of disc brake assemblies, with each assembly being operatively mounted on or adjacent a wheel end of the vehicle.

Typically, each disc brake assembly includes a carrier, which supports a caliper. The carrier is attached to a torque plate, typically by mechanical fasteners, such as bolts. The torque plate in turn is rigidly connected to an axle of an axle/suspension system of the vehicle, such as by welding. The torque plate is located on or adjacent a wheel end of the heavy-duty vehicle. The torque plate resists the torque that is generated during braking and maintains proper alignment of the caliper to ensure optimum operation of the components of the disc brake assembly.

The caliper is slidably connected to the carrier in a known manner. More specifically, the carrier is formed with a pair of threaded openings. A counterbore is formed on the inboard side of the carrier around each one of the pair of threaded openings. An inboardly extending hollow guide pin is positioned within each counterbore, and in turn is attached to the carrier via a socket head cap screw disposed within the guide pin that engages the threaded opening. The caliper is formed with a pair of bores. A bushing is press fit into each caliper bore and is disposed on a respective guide pin, enabling the caliper to slidably engage the guide pins to allow transverse movement of the caliper relative to the carrier in a known manner.

The caliper is formed with a bore for receiving one or more pistons and a plurality of openings for receiving an actuator. The actuator typically is an air chamber, referred to as a brake chamber in the art, which is in fluid communication with a compressed air source and activates movement of the piston(s) through a sealed mechanical actuation mechanism. The sealed mechanical actuation mechanism amplifies the force between the actuator and the piston(s). The caliper also includes an outboard pad seat that is disposed opposite the piston(s). A pair of brake pads are seated in the carrier, with one of the brake pads being adjacent the piston(s) and the other brake pad being adjacent the outboard pad seat. Each one of the pair of opposing brake pads includes friction material that is mounted on a backing plate.

The rotor includes a disc portion, which is disposed between the pair of opposing brake pads in a manner that allows the friction material of each pad to face a respective one of an inboard and an outboard surface of the disc portion. The rotor also includes a mounting portion that enables the rotor to be mounted to a wheel hub of a respective wheel end assembly with mechanical fasteners, such as bolts. A sleeve is integrally formed with and extends between the disc portion and the mounting portion of the rotor. The wheel hub is rotatably mounted on the vehicle axle in a known manner. One or more tire rims and tires in turn are mounted on the wheel hub. Because the rotor is mechanically attached to the wheel hub, as the tire rotates during vehicle operation, the rotor also rotates about the vehicle axle.

During vehicle travel, when the vehicle brake system is engaged, compressed air flows to the actuator via an air hose. Actuation of the actuator causes outboard movement of the caliper piston(s), which in turn forces the brake pad adjacent the piston(s) outboardly. As the brake pad is forced against the inboard surface of the rotor, because the caliper slidably engages the carrier via the guide pins, the caliper is forced inboardly, which in turn forces the brake pad adjacent the outboard pad seat against the outboard surface of the rotor. Together, contact of the brake pads against the inboard and outboard surfaces of the rotor disc portion slows and/or stops rotation of the wheel hub, and thus the vehicle wheel.

Alternatively, in certain disc brake assembly configurations, the disc brake assembly does not include a carrier. In such applications, the caliper is directly slidably connected to the torque plate. More specifically, the torque plate is formed with a pair of threaded openings. A counterbore is formed on the inboard side of the torque plate around each one of the pair of threaded openings. An inboardly extending hollow guide pin is positioned within each counterbore, and in turn is attached to the torque plate via a socket head cap screw disposed within the guide pin which engages the threaded opening. The caliper is formed with a pair of bores. A bushing is press fit into each caliper bore and is disposed on a respective guide pin, enabling the caliper to slidably engage the guide pins to allow transverse movement of the caliper relative to the torque plate in a known manner.

In brake assemblies with both carrier and non-carrier configurations, it may become necessary to service and/or remove the heavy-duty vehicle wheel hub, rotor, and/or caliper components, such as the guide pin bushings. When the wheel hub, rotor, and/or caliper components need to be serviced and/or removed, components of the brake assemblies, including the caliper and carrier, must typically be positioned away from the wheel end a sufficient distance to allow servicing and/or removal of the wheel hub, rotor, and/or caliper components. Conventional means typically requires a vehicle service technician to detach the guide pins from the torque plate or detach the carrier from the torque plate, remove the air hose from the actuator, and then manually lift the brake caliper, actuator, and in brake assemblies which require one, the carrier away from the vehicle wheel end. In heavy-duty vehicles, the caliper and associated brake assembly components typically weigh upward of 80 lbs. or more. Due to the weight of the caliper, manual removal of the caliper and associated brake assembly components is often very cumbersome and can potentially result in injury to the service technician during removal and subsequent movement. In addition, because the brake chamber or air hose must typically be removed from the brake chamber in order to allow the service technician to move the caliper and associated brake assembly components away from the wheel end, the air hose can be exposed to contaminants, which when reattached to the actuator, can potentially have detrimental effects on performance of the vehicle disc air brake system. Alternatively, the service technician could disconnect the actuator from the caliper, leaving the air hose attached to the actuator, but disconnection of the actuator from the caliper is generally undesirable as contaminants can possibly be introduced into the mechanical actuation mechanism inside the caliper, which can potentially render the caliper inoperable. In addition, because of the weight of the caliper and associated brake assembly components, aligning the caliper guide pins with the carrier, or torque plate in non-carrier brake assembly configurations, by manually lifting the caliper during reattachment of the caliper can be difficult.

Alternative conventional means for moving the caliper away from the wheel end to allow servicing or removal of the wheel hub, brake rotor, and/or caliper components includes the use of a discrete crane, such as an engine crane, or other similar discrete lifting devices. In such instances, the caliper guide pins are first detached from the torque plate or the carrier detached from the torque plate. A crane harness attached to the crane, or other similar crane component, is connected to the caliper and associated brake assembly components, which in turn are lifted via a lifting mechanism of the crane a sufficient distance from the vehicle wheel end to allow servicing or enable removal of the wheel hub, rotor, and/or caliper components. By utilizing a discrete crane or other similar device to position the caliper away from the vehicle wheel end, the air hose does not typically need to be disconnected from the actuator to service and/or remove of the wheel hub, rotor, and/or caliper components. While suitable for its intended purpose, a discrete crane or other similar lifting device may not be suitable or optimal in certain circumstances. For example, heavy-duty vehicles typically include a trailer body or fender adjacent the wheel end, which do not provide sufficient clearance adjacent the wheel end to utilize an overhead crane to lift the caliper and associated brake components to provide sufficient space to service and/or remove the wheel hub, rotor, and/or caliper components. In addition, in certain heavy-duty vehicle trailers, the body of a heavy-duty vehicle trailer can include certain structural features located beneath the vehicle, such as splash guards or aerodynamic structural features, which also prevent the use of a typical shop crane. In addition, some mechanic shops lack the necessary space to support use of such devices.

Thus, there is a need in the art for a brake component positioning assembly for heavy-duty vehicles that allows a caliper and associated brake assembly components to be moved away from the vehicle wheel end to allow servicing and/or removal of the wheel hub, rotor, and/or caliper components, without requiring disconnection of the air hose from the actuator or the actuator from the caliper, and manual removal and movement of the caliper and associated brake assembly components from the wheel end. There also is a need in the art for a brake component positioning assembly for heavy-duty vehicles that eliminates the need to utilize a discrete lifting device, such as a crane, thereby providing a more service friendly mechanism for servicing and/or removing components of the wheel end assembly and/or caliper, and minimizing the potential for contaminants to be introduced into the brake air hoses and/or caliper during servicing and/or removal of the components. There is also a need for a brake component positioning assembly that facilitates alignment of the caliper guide pins with the carrier, or torque plate in non-carrier configurations, during reattachment of the caliper to the carrier or torque plate after servicing and/or reattachment of the wheel hub, rotor, and/or guide pin bushings or other components of the caliper. The brake component positioning assembly for heavy-duty vehicles of the disclosed subject matter satisfies these needs, as will be described in detail below.

BRIEF SUMMARY OF THE DISCLOSED SUBJECT MATTER

An objective of the disclosed subject matter is to provide a structure that allows a caliper and associated brake components of a vehicle brake system to be moved away from a wheel end assembly to facilitate servicing and/or removal of a wheel hub, rotor, and/or guide pin bushings or other components of the caliper, without requiring removal of the air hose from the actuator and manual removal of the caliper and associated brake assembly components from the wheel end.

Another objective of the disclosed subject matter is to provide a structure that eliminates the need to utilize a discrete crane to service and/or remove the wheel hub, rotor, and/or guide pin bushings or other components of the caliper.

Yet another objective of the disclosed subject matter is to provide a more service friendly mechanism for servicing and/or removing the wheel hub, rotor, and/or guide pin bushings or other components of the caliper.

Still another objective of the disclosed subject matter is to provide a structure that minimizes the potential for contaminants to be introduced into the brake air hoses during servicing and/or removal of the wheel hub, rotor, and/or guide pin bushings or other components of the caliper.

Yet another objective of the disclosed subject matter is to provide a structure that facilitates alignment of caliper guide pins with a carrier or torque plate during reattachment of the caliper to the carrier or torque plate after servicing and/or reattachment of the wheel hub, rotor, and/or caliper pin bushings or other components of the caliper.

These objectives and others are achieved by the brake component positioning structure for a heavy-duty vehicle of the disclosed subject matter, which includes a positioning assembly. The positioning assembly is removably connectable to a component of the heavy-duty vehicle. The positioning assembly enables a brake system component to be moved away from a wheel end of the heavy-duty vehicle to allow removal or servicing of at least one component of a wheel end assembly or the vehicle brake system.

BRIEF DESCRIPTION OF THE SEVRAL VIEWS OF THE DRAWINGS

The exemplary embodiments of the disclosed subject matter, illustrative of the best modes in which Applicant has contemplated applying the principles, are set forth in the following description and are shown in the drawings.

Figure 8:
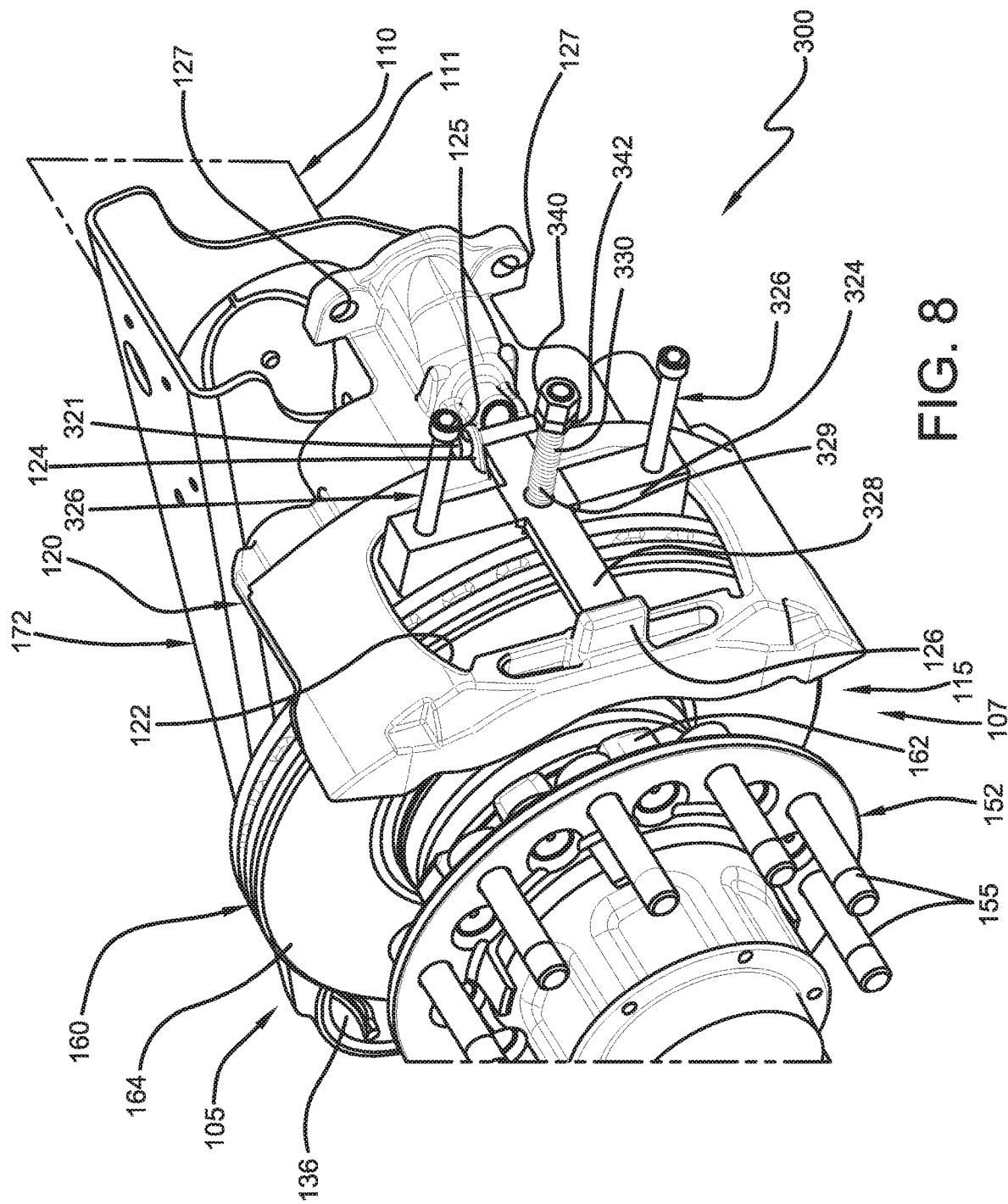
FIG. 8 is a fragmentary driver side perspective view of the heavy-duty vehicle trailing arm axle/suspension system with disc air brake system of FIG. 3, incorporating a second exemplary embodiment brake component positioning assembly of the disclosed subject matter.
Figure 11:
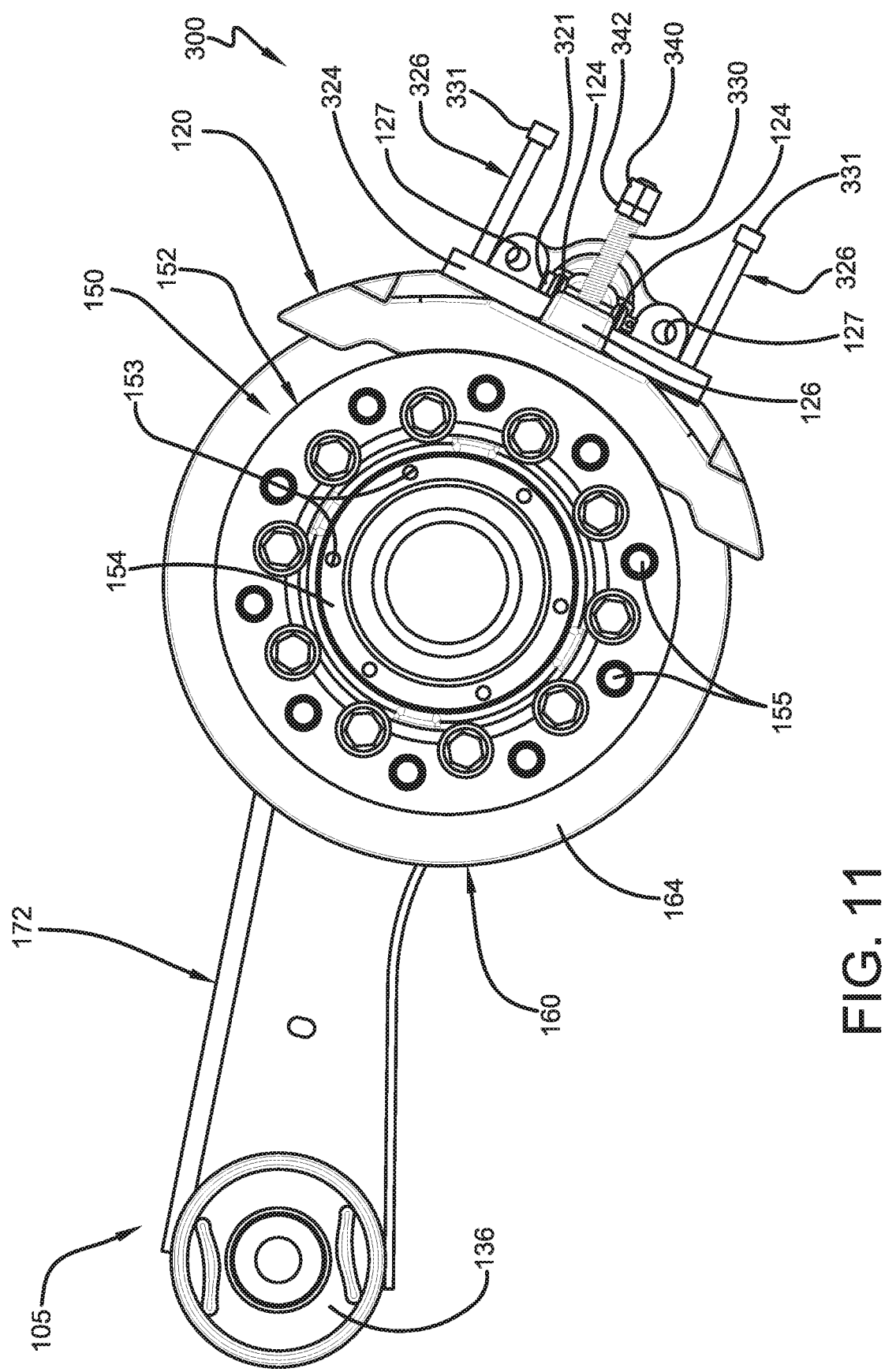
Figure 12:
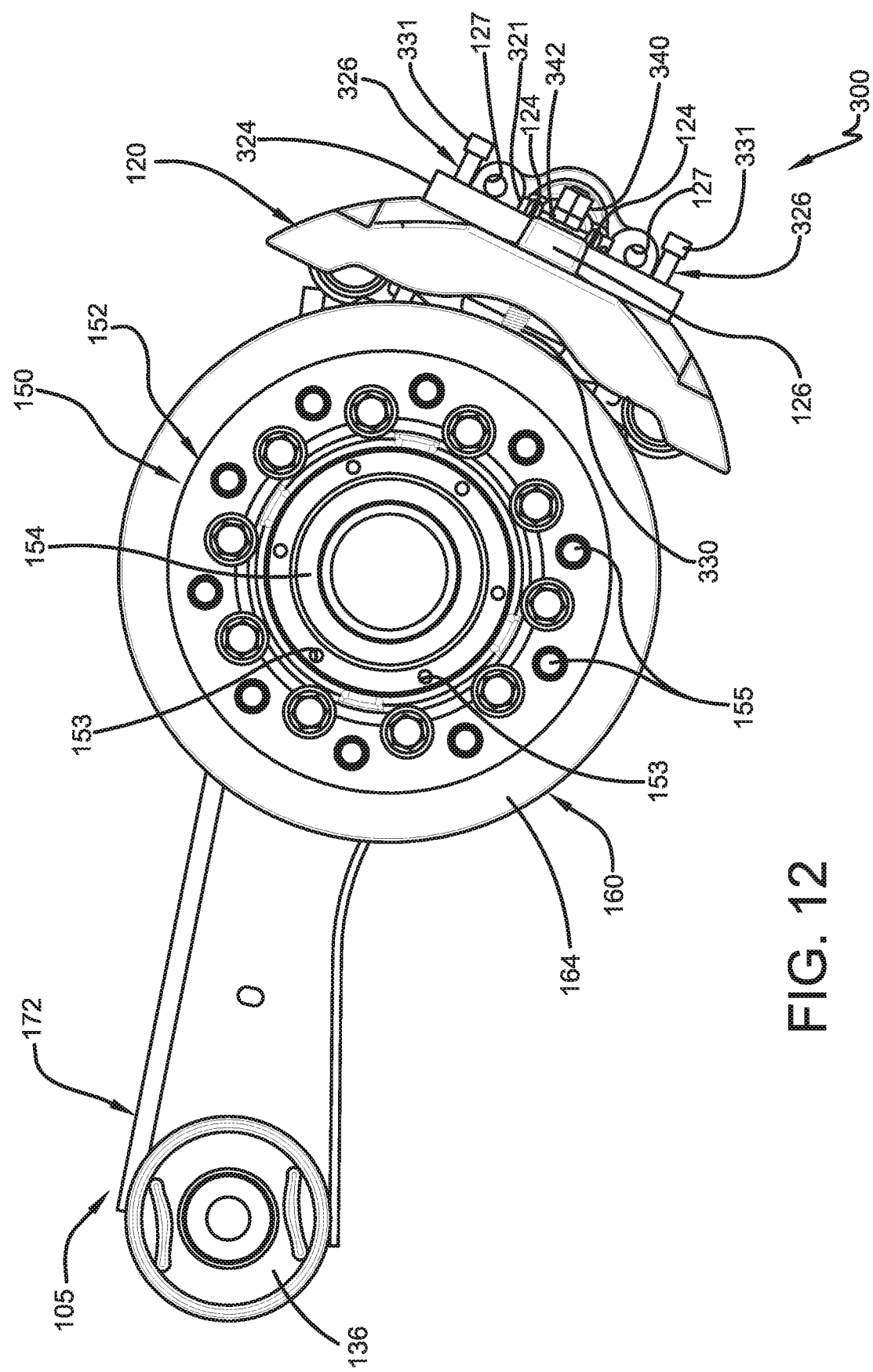

FIG. 11 is a driver side elevational view of a portion of the trailing arm axle/suspension system with incorporated second exemplary embodiment brake component positioning assembly of FIG. 8, showing the location of the caliper relative to the wheel end prior to being positioned away from the wheel end with the exemplary embodiment brake component positioning assembly; and FIG. 12 is a view similar to FIG. 11, showing the location of the caliper relative to the wheel end after being positioned away from the wheel end with the second exemplary embodiment brake component positioning assembly.

Similar numerals refer to similar parts throughout the drawings.

DETAILED DESCRIPTION OF THE DISCLOSED SUBJECT MATTER

Figure 1:
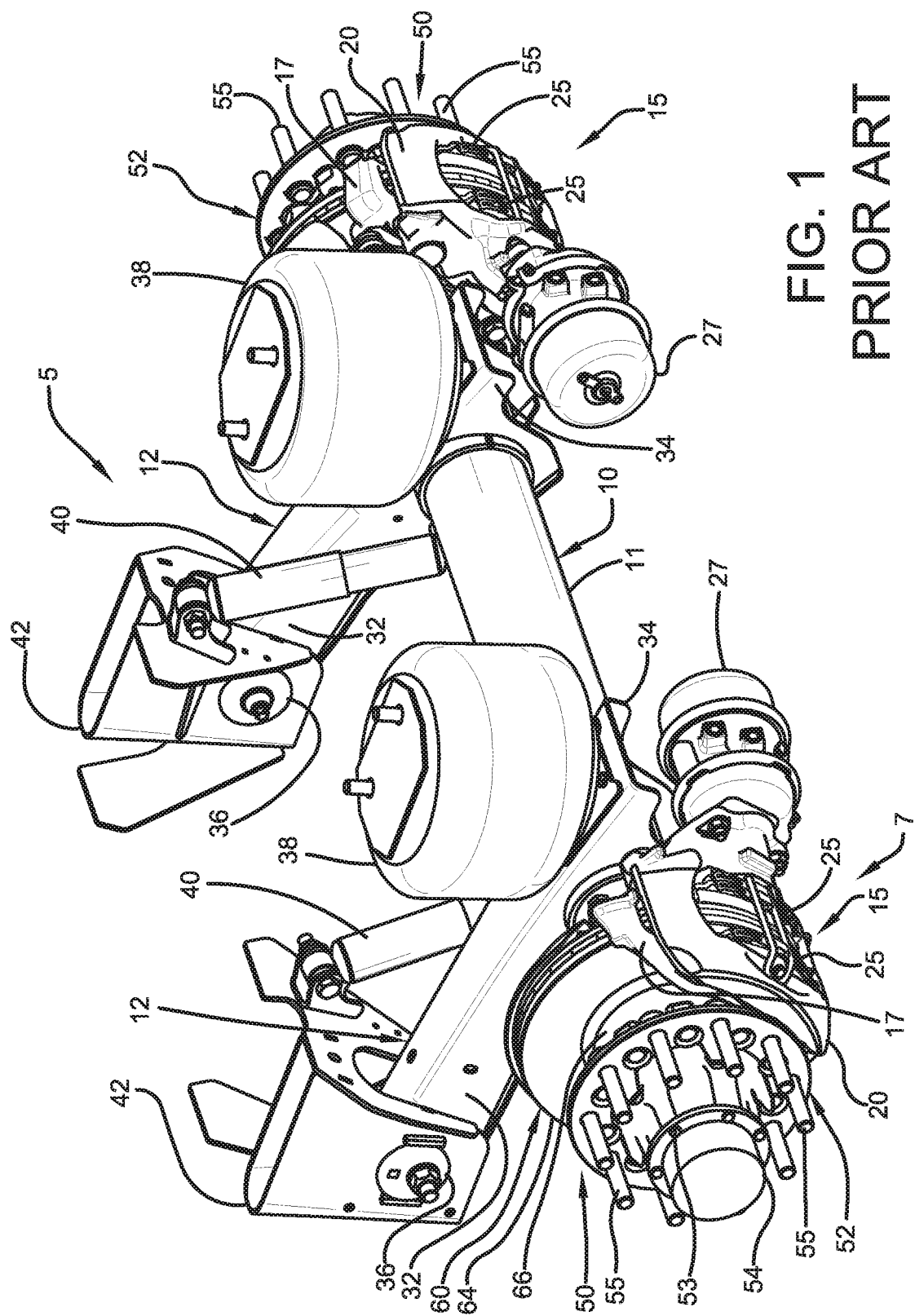
FIG. 1 is a driver side perspective view of a heavy-duty vehicle trailing arm axle/suspension system which includes a disc air brake system.
Figure 2:
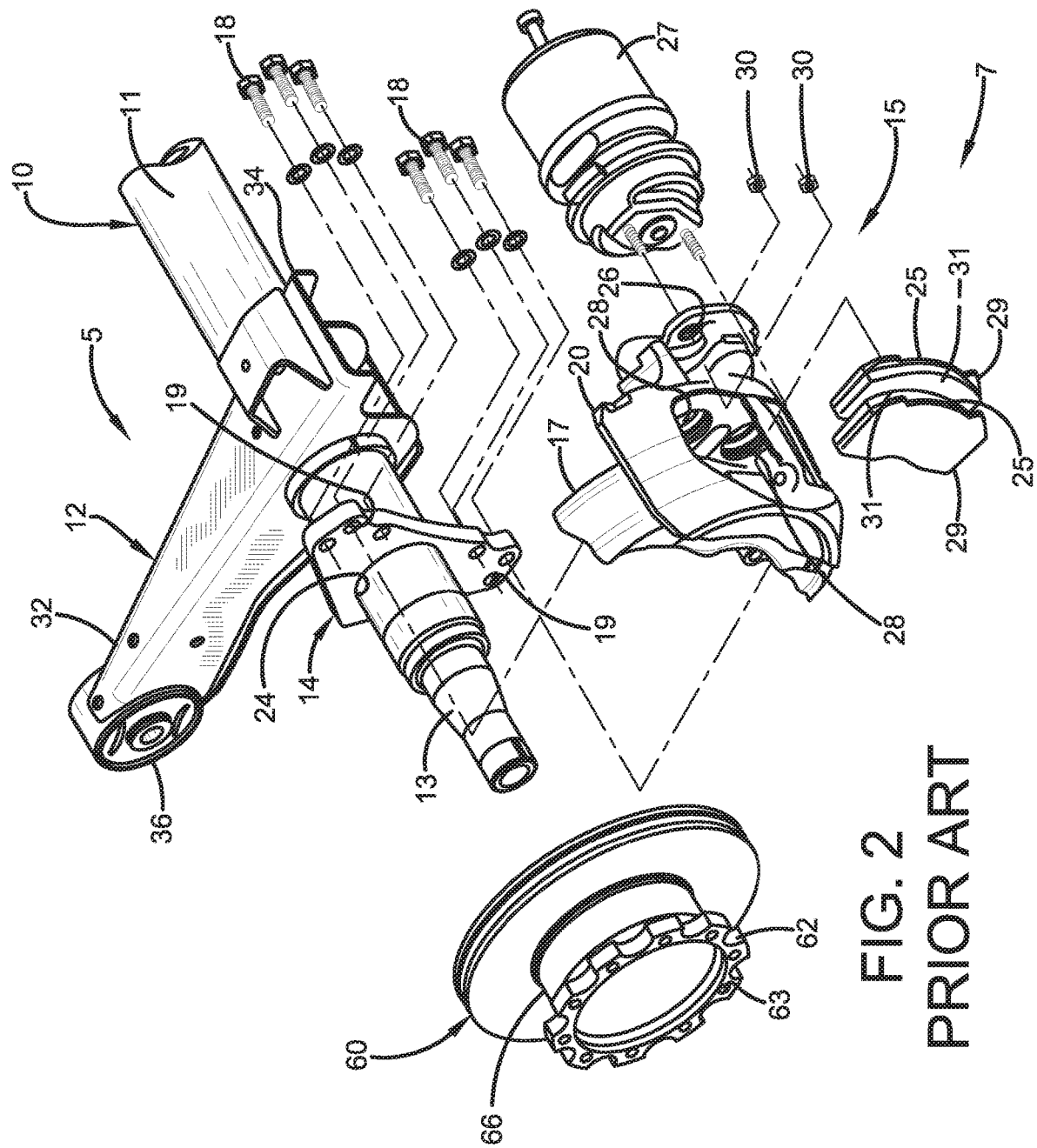
FIG. 2 is a fragmentary driver side perspective view of a portion of the heavy-duty vehicle trailing arm axle/suspension system of FIG. 1, with components of the disc air brake system and wheel end assembly shown in exploded view.

In order to better understand the brake component positioning assembly for heavy-duty vehicles of the disclosed subject matter and the environment in which it operates, a trailing arm axle/suspension system for heavy-duty vehicles is shown in FIGS. 1 and 2, and is indicated generally at 5. Heavy-duty vehicles include trucks, trailers, tractor-trailers or semi-trailers. Reference will be made generally to a heavy-duty vehicle for the purpose of convenience, with the understanding that such reference includes trucks, trailers, tractor-trailers and/or semi-trailers.

Axle/suspension system 5 is an air-ride beam-type axle/suspension system of a type known in the art. Axle/suspension system 5 includes a pair of transversely spaced hangers 42 that are mounted on and depend from members of a frame or subframe (not shown) of a heavy-duty vehicle. Axle/suspension system 5 includes a pair of trailing arm beams 12. Each beam is pivotally connected to a respective hanger 42. More specifically, each beam 12 includes a front end 32 having a bushing assembly 36. Bushing assembly 36 is utilized to pivotally connect each beam 12 to a respective one of the hangers 42. Each beam 12 also includes a rear end 34, which is welded or otherwise rigidly attached to a central tube 11 of an axle 10 extending transversely between the beams.

Axle 10 includes a pair of axle spindles 13. Each one of pair of axle spindles 13 is attached to a respective one of the ends of central tube 11 and extends outboardly from the central tube. Axle/suspension system 5 also includes a pair of air springs 38. Each one of air springs 38 is mounted on rear end 34 of a respective one of beams 12 and extends between and is connected to a respective one of the heavy-duty vehicle frame or subframe members. A shock absorber 40 is mounted to each beam 12 and extends between and is attached to a respective one of hangers 42.

A wheel end assembly 50 is mounted on each axle spindle 13. For purposes of conciseness and clarity, only one axle spindle 13 and its respective wheel end assembly 50 will be described. Wheel end assembly 50 includes a wheel hub 52. Wheel hub 52 includes a bearing assembly having an inboard bearing (not shown) and an outboard bearing (not shown) mounted on the outboard end of axle spindle 13. Wheel hub 52 is rotatably mounted on axle spindle 13 via the inboard and outboard bearings, as is known. A spindle nut assembly (not shown) threadably engages the outboard end of axle spindle 13 and secures wheel hub 52 and the inboard and outboard bearings in place.

A hub cap 54 is attached to the outboard end of wheel hub 52 with a plurality of fasteners 53. Each one of fasteners 53 passes through a respective one of a plurality of openings (not shown) formed in hub cap 54, and threadably engages a respective one of a plurality of aligned threaded openings (not shown) that are formed in wheel hub 52. In this manner, hub cap 54 closes the outboard end of wheel hub 52, and thus wheel end assembly 50. A main continuous seal (not shown) is rotatably mounted on the inboard end of wheel hub 52 and closes the inboard end of the wheel hub, and thus wheel end assembly 50, to maintain lubricant in the wheel end assembly, as is known. A tire rim or a pair of tire rims (not shown), depending on specific design characteristic, is mounted on a plurality of threaded bolts 55 of wheel hub 52, and is secured thereon with mating nuts (not shown). A tire (not shown) is mounted on each respective tire rim, as is known.

Wheel end assembly 50 also includes a rotor 60. Rotor 60 includes a radially-extending mounting portion or flange 62. Flange 62 is formed with a plurality of openings 63 (FIG. 2) to receive suitable fasteners (not shown), such as bolts. Wheel hub 52 is formed with openings (not shown) which correspond to openings 63 of flange 62. The fasteners pass through aligned ones of the wheel hub openings and flange openings to removably secure rotor 60 to wheel hub 52. Rotor 60 also includes a radially extending disc portion 64. An axially-extending sleeve 66 of rotor 60 is integrally formed with and extends between disc portion 64 and flange 62. Sleeve 66 of rotor 60 enables disc portion 64 to be rigidly connected to flange 62, and thus wheel hub 52. This construction enables rotor 60 to rotate with wheel hub 52, while being removable from the wheel hub for servicing.

Axle/suspension system 5 includes an air brake system 7 to provide braking during operation of the heavy-duty vehicle. Air brake system 7 includes a pair of brake assemblies 15, with each being mounted to axle/suspension system 5 on a respective transverse opposite side of the axle/suspension system. Inasmuch as brake assemblies 15 are similar, for purposes of conciseness and clarity only one of the pair of brake assemblies will be described in detail. With particular reference to FIG. 2, brake assembly 15 includes a torque plate 14. Torque plate 14 is formed with a bore 24, through which the torque plate is disposed on central tube 11 of axle 10. Torque plate 14 is welded or otherwise rigidly attached to central tube 11 outboard of beam 12. Brake assembly 15 includes a carrier 17 mechanically fastened to a plurality of openings 19 formed in torque plate 14 by bolts 18 or other mechanical means.

Brake assembly 15 further includes a caliper 20 which is slidably connected to carrier 17. More specifically, carrier 17 is formed with a pair of threaded openings (not shown). A counterbore (not shown) is formed on the inboard side of carrier 17 around each one of the pair of threaded openings. An inboardly extending hollow guide pin (not shown) is positioned within each counterbore, and in turn is attached to carrier 17 via a socket head cap screw (not shown) disposed within the guide pin which engages the threaded opening. Caliper 20 is formed with a pair of bores (not shown). A bushing (not shown) is press fit into each caliper bore and is disposed on a respective guide pin, enabling caliper 20 to slidably engage the guide pins to allow transverse movement of the caliper relative to carrier 17 in a known manner.

Alternatively, in certain brake assembly configurations, the brake assembly does not include a carrier. In such applications, a caliper is directly slidably connected to torque plate 14 via guide pins attached to the torque plate similarly to that described above with respect to brake assemblies which include a carrier.

With particular reference to FIG. 2, caliper 20 is formed with one or more piston bores 28 for receiving one or more pistons (not shown). Caliper 20 is also formed with a pair of openings 26 for removably attaching an actuator 27 of brake assembly 15 to the caliper utilizing nuts 30. Actuator 27 is in fluid communication with a compressed air source (not shown) of the heavy-duty vehicle via an air hose (not shown) and activates movement of the one or more pistons through a sealed mechanical actuation mechanism (not shown) that amplifies the force between the actuator and the one or more pistons. Torque plate 14 is positioned radially on central tube 11 of axle 10 such that actuator 27 extends inboardly from its attachment to caliper 20 without interference from beam 12.

Caliper 20 also includes an outboard pad seat (not shown) that is disposed opposite the one or more pistons, as is known. A pair of brake pads 25 are seated in carrier 17 on opposing sides of disc portion 64 of rotor 60, with one of the brake pads being adjacent the piston(s) of caliper 20 and the other brake pad being adjacent the outboard pad seat of the caliper. Each one of pair of opposing brake pads 25 includes friction material 31 that is mounted on a backing plate 29. In air brake assembly configurations which do not include a carrier, one of brake pads 25 is seated within the caliper outboard of disc portion 64 of rotor 60 and the other brake pad is seated within the torque plate inboard of the rotor.

During vehicle travel, when air brake system 7 is engaged, compressed air flows to actuator 27 via the air hose. Actuation of actuator 27 causes outboard movement of the one or more pistons of caliper 20, which in turn forces friction material 31 of brake pad 25 adjacent the one or more pistons outboardly against the inboard surface of disc portion 64 of rotor 60. As brake pad 25 adjacent the one or more pistons is forced against the inboard surface of disc portion 64 of rotor 60, because caliper 20 slidably engages carrier 17 via the guide pins, the caliper is forced inboardly, which in turn forces friction material 31 of brake pad 25 adjacent the outboard pad seat against the outboard surface of the rotor disc portion. Together, contact of brake pads 25 against the outboard and inboard surfaces of disc portion 64 of rotor 60 slows and/or stops rotation of the rotor, and thus slows and/or stops rotation of wheel hub 52 and the vehicle wheel. It is to be understood that in configurations of air brake assembly 15 without a carrier, disc air brake system 7 functions similarly.

During operation of the heavy-duty vehicle with axle/suspension system 5, it may become necessary to service and/or remove wheel hub 52, rotor 60, and/or the guide pin bushings or other components of caliper 20. When wheel hub 52, rotor 60, and/or guide pin bushings or other components of caliper 20 need to be serviced and/or removed, components of brake assembly 15 of air brake system 7, including caliper 20, carrier 17, and actuator 27, must typically be positioned away from wheel end assembly 50 a sufficient distance to allow such servicing or removal. Conventional means of positioning carrier 17, caliper 20, and actuator 27 away from wheel end assembly 50 typically requires a vehicle service technician to detach carrier 17 from torque plate 14, or in configurations of air brake assembly 15 without a carrier, detach the guide pins of caliper 20 from torque plate 14, disconnect the air hose from actuator 27 or disconnect the actuator from the caliper, and then manually lift/shift the caliper and associated brake assembly components away from the vehicle wheel end, or alternatively, utilize a discrete crane (not shown) or other similar lifting/lowering device to move the caliper and associated brake assembly components away from the vehicle wheel end. Such conventional means are subject to several disadvantages, as enumerated in the disclosure above.

Thus, there is a need in the art for a structure for heavy-duty vehicles that allows caliper 20 and associated brake assembly 15 components, such as actuator 27, to be moved away from wheel end assembly 50 to allow servicing and/or removal of wheel hub 52, rotor 60, and/or guide pin bushings or other components of the caliper without requiring removal of the air hose from the actuator or the actuator from the caliper, and manual removal of the caliper and associated brake components from the wheel end. There is also a need in the art to eliminate the need to utilize a discrete crane for such servicing and/or removal, thereby providing a more service friendly mechanism for servicing and/or removing the wheel end assembly components and/or caliper components. There is also a need in the art for minimizing the potential for contaminants to be introduced into the brake air hoses or caliper mechanical actuation mechanism during such servicing and/or removal. In addition, there is a need in the art for a structure that facilitates alignment of the caliper guide pins with the carrier or torque plate during reattachment of the caliper to the carrier or torque plate after servicing and/or reattachment of the wheel hub, rotor, and/or guide pin bushings or other components of the caliper. The brake component positioning assembly of the disclosed subject matter satisfies these needs and will now be described.

Figure 3:
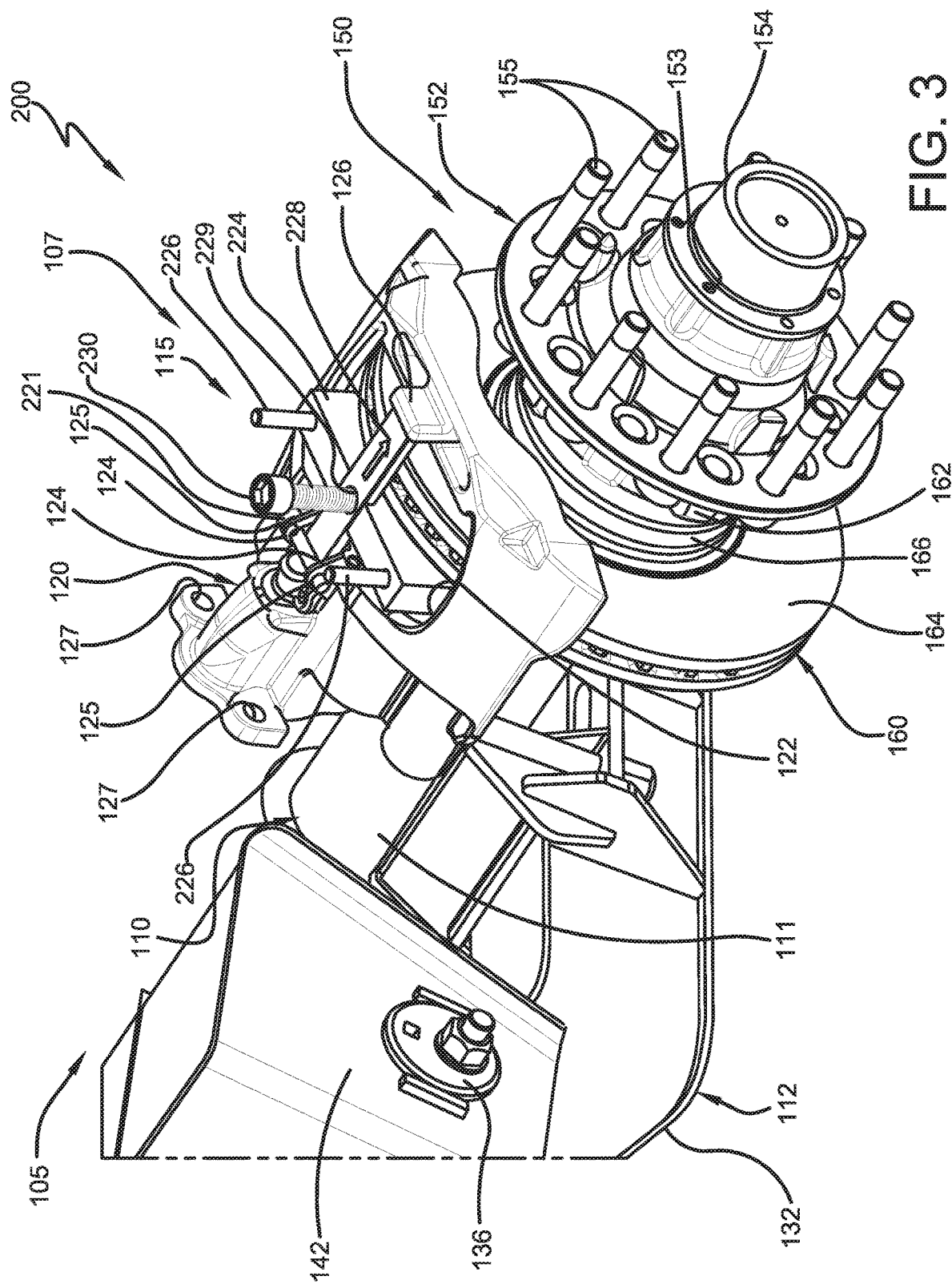
FIG. 3 is a fragmentary driver side perspective view of a heavy-duty vehicle trailing arm axle/suspension system, which includes a disc air brake system incorporating a first exemplary embodiment brake component positioning assembly of the disclosed subject matter.
Figure 5:
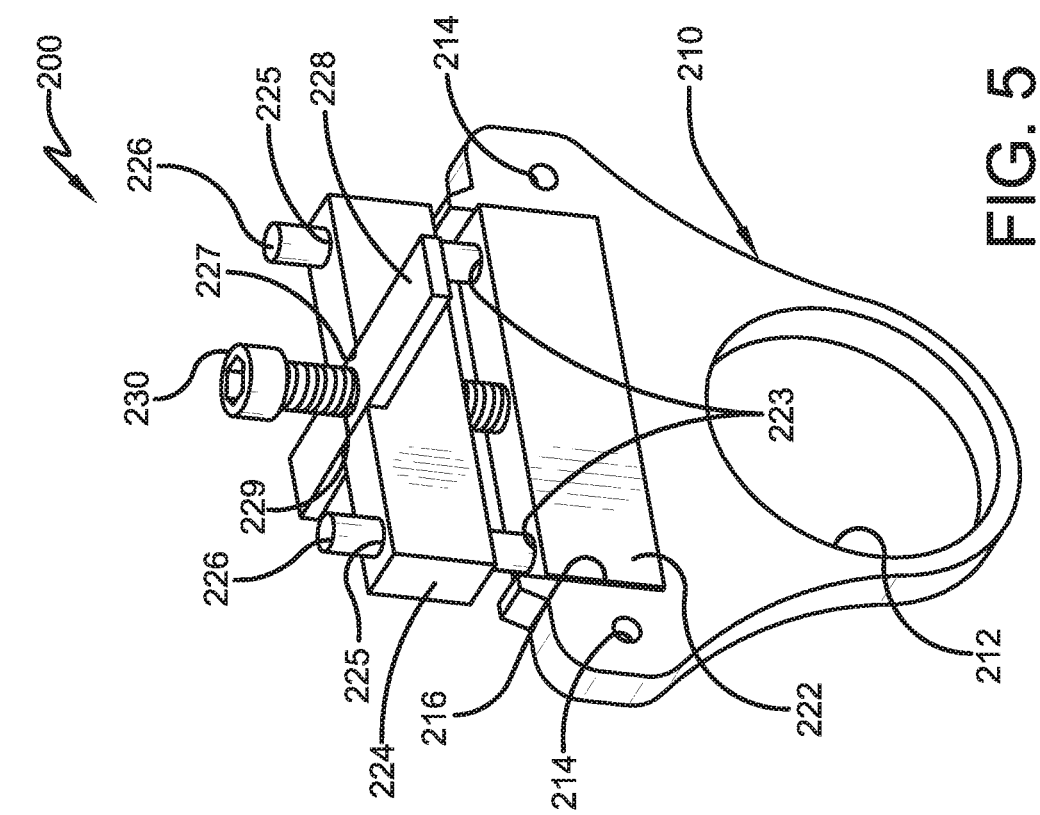
FIG. 5 is a driver side perspective view of the torque plate of FIG. 4, shown with components of the first exemplary embodiment brake component positioning assembly of FIG. 3 attached thereto.
Figure 4:
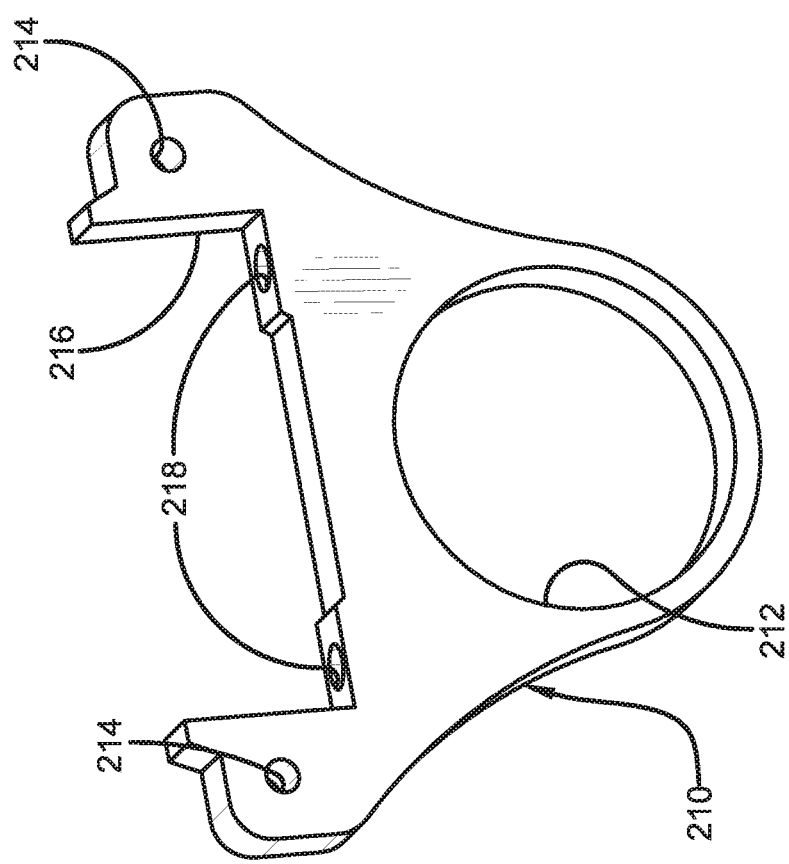
FIG. 4 is a driver side perspective view of a torque plate used with the first exemplary embodiment brake component positioning assembly of FIG. 3.

A first exemplary embodiment brake component positioning structure or assembly for heavy-duty vehicles of the disclosed subject matter is shown in FIGS. 3-5, and is indicated generally at 200. First exemplary embodiment brake component positioning assembly 200 is shown utilized with a heavy-duty vehicle axle/suspension system 105. Axle/suspension system 105 is an air-ride beam-type axle/suspension system similar in structure and function to axle/suspension system 5 (FIGS. 1-2).

Axle/suspension system 105 includes a pair of transversely spaced hangers 142 that are mounted on and depend from members of a frame or subframe (not shown) of a heavy-duty vehicle. Axle/suspension system 105 includes a pair of trailing-arm beams 112. Each beam is pivotally connected to a respective hanger 142. More specifically, each beam 112 includes a front end 132 having a bushing assembly 136. Bushing assembly 136 is utilized to pivotally connect each beam 112 to a respective one of hangers 142. Each beam 112 also includes a rear end 134, which is welded or otherwise rigidly attached to a central tube 111 of an axle 110 extending transversely between the beams.

Figure 7:
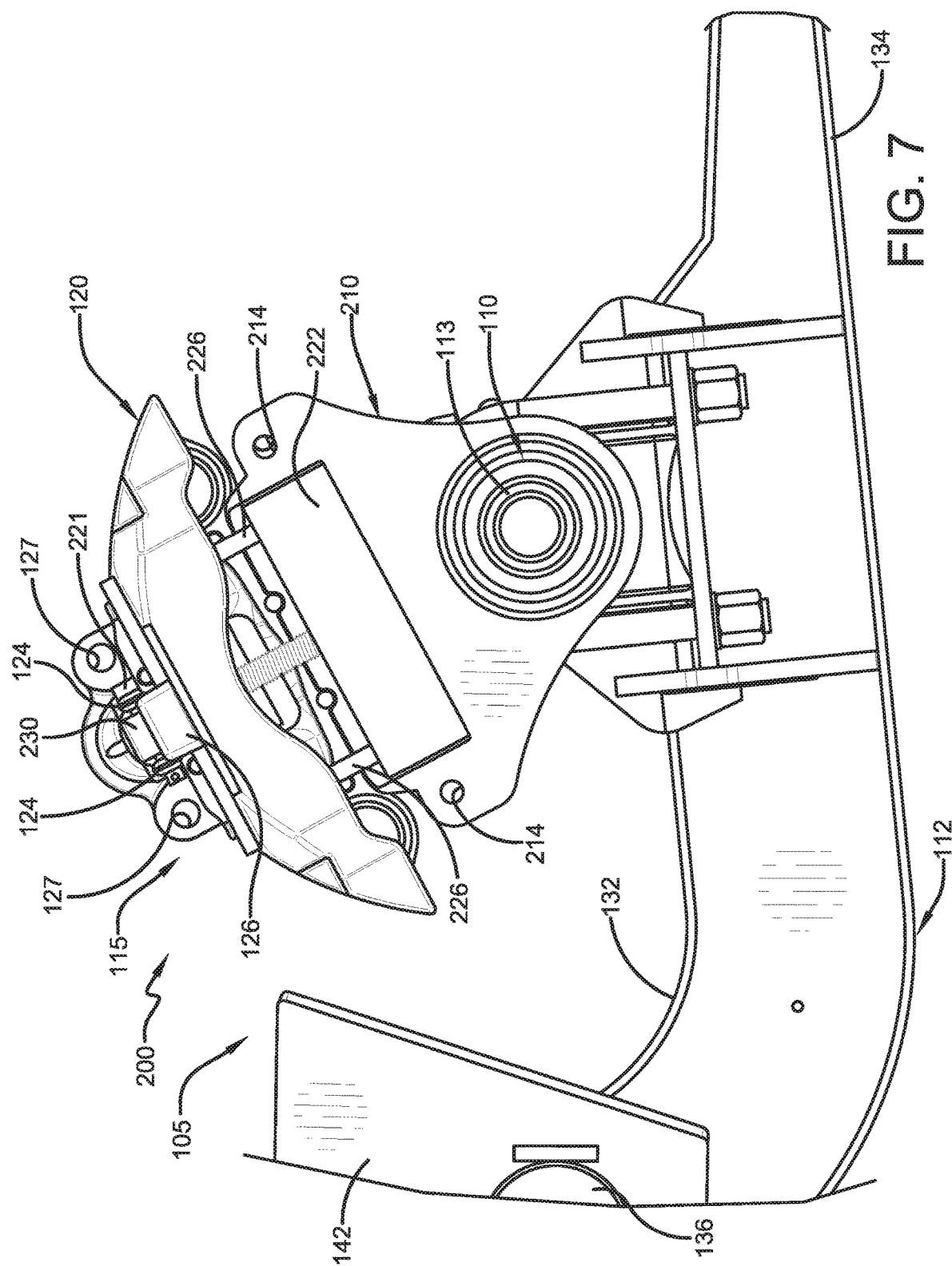
FIG. 7 is a view similar to FIG. 6, showing the location of the caliper relative to the wheel end after being positioned away from the wheel end with the first exemplary embodiment brake component positioning assembly, and showing the rotor and wheel hub removed.

With reference to FIG. 7, axle 10 includes a pair of axle spindles 113. Each one of a pair of axle spindles 113 is attached to a respective one of the ends of central tube 111 of axle 110 and extends outboardly from the central tube. Axle/suspension system 105 also includes a pair of air springs (not shown), such as air springs 38 (FIG. 1-2). Each one of the air springs is mounted on rear end 134 of a respective one of beams 112 and extends between and is connected to a respective one of the heavy-duty vehicle frame or subframe members. Axle/suspension system 105 can include a shock absorber (not shown), such as shock absorber 40 (FIG. 1-2), mounted to each beam 112 and extending between and being attached to a respective one of hangers 142 or the heavy-duty vehicle frame or subframe members.

A wheel end assembly 150 is mounted on each axle spindle 113. For purposes of conciseness and clarity, only one axle spindle 113 and its respective wheel end assembly 150 will be described. Wheel end assembly 150 includes a wheel hub 152. Wheel hub 152 includes a bearing assembly having an inboard bearing (not shown) and an outboard bearing (not shown) mounted on the outboard end of axle spindle 113. Wheel hub 152 is rotatably mounted on axle spindle 113 via the inboard and outboard bearings, as is known. A spindle nut assembly (not shown) threadably engages the outboard end of axle spindle 113 and secures wheel hub 152 and the inboard and outboard bearings in place.

A hub cap 154 is attached to the outboard end of wheel hub 152 with a plurality of fasteners (not shown). Each one of the fasteners passes through a respective one of a plurality of openings 153 formed in hub cap 154, and threadably engages a respective one of a plurality of aligned threaded openings (not shown) formed in wheel hub 152. In this manner, hub cap 154 closes the outboard end of wheel hub 152, and thus wheel end assembly 150. A main continuous seal (not shown) is rotatably mounted on the inboard end of wheel hub 152 and closes the inboard end of the wheel hub, and thus wheel end assembly 150, to maintain lubricant in the wheel end assembly, as is known. A tire rim or pair of tire rims, depending on specific design characteristics, is mounted on a plurality of threaded bolts 155 of wheel hub 152, and is secured thereon with mating nuts (not shown). A tire (not shown) is mounted on each respective tire rim, as is known.

Wheel end assembly 150 also includes a rotor 160. Rotor 160 includes a radially-extending mounting portion or flange 162. Flange 162 is formed with a plurality of openings (not shown) to receive suitable fasteners (not shown), such as bolts. Wheel hub 152 is formed with openings (not shown) which correspond to the openings of flange 162. The fasteners pass through aligned ones of the wheel hub openings and flange openings to removably secure rotor 160 to wheel hub 152. Rotor 160 also includes a radially extending disc portion 164. With reference to FIG. 3, an axially-extending sleeve 166 of rotor 160 is integrally formed with and extends between disc portion 164 and flange 162. Sleeve 166 of rotor 160 enables disc portion 164 of rotor 160 to be rigidly connected to flange 162, and thus wheel hub 152. This construction enables rotor 160 to rotate with wheel hub 152, while being removable from the wheel hub for servicing.

Axle/suspension system 105 includes an air brake system 107 to provide braking during operation of the heavy-duty vehicle. Air brake system 107 includes a pair of brake assemblies 115, with each being mounted to axle/suspension system 105 on a respective transverse opposite side of the axle/suspension system. Pair of brake assemblies 115 are similar in structure and function to pair of brake assemblies 15 (FIGS. 1-2), except that the brake assemblies are of the type that do not utilize carriers. Inasmuch as each one of pair of brake assemblies 115 is similar to the other, for purposes of conciseness and clarity only one of the pair of brake assemblies will be described in detail.

Figure 6:
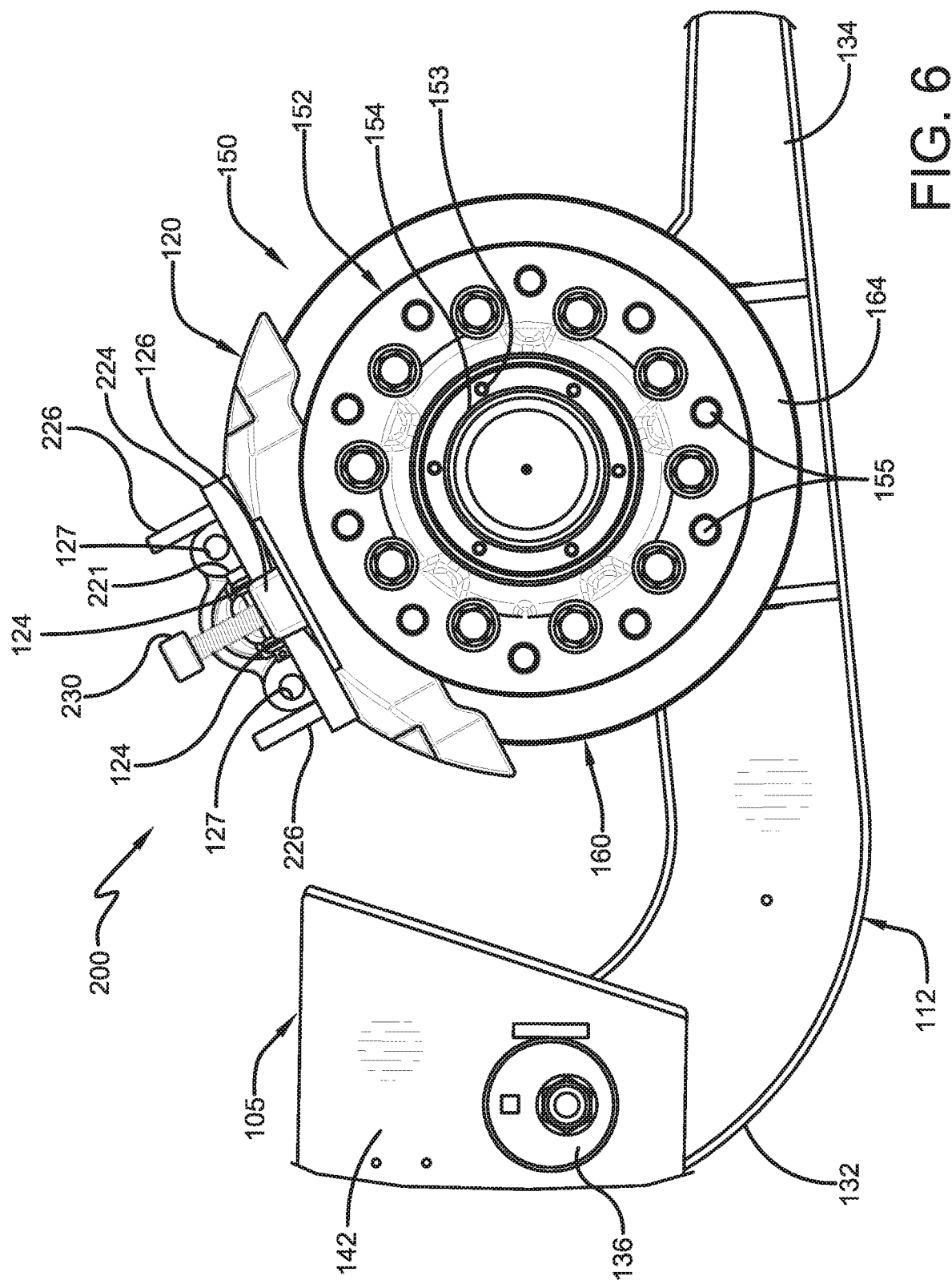
FIG. 6 is a driver side fragmentary elevational view of a portion of the trailing arm axle/suspension system with incorporated first exemplary embodiment brake component positioning assembly of FIG. 3, showing the location of the caliper relative to the wheel end prior to being positioned away from the wheel end with the exemplary embodiment brake component positioning assembly.

Brake assembly 115 includes a caliper 120. Caliper 120 is formed with one or more bores (not shown) for receiving one or more pistons (not shown). With reference to FIGS. 3 and 6-7, caliper 120 is also formed with a pair of openings 127 for removably attaching an actuator (not shown) to the caliper utilizing nuts (not shown). The actuator, typically a brake air chamber, is in fluid communication with a compressed air source (not shown) of the heavy-duty vehicle via an air hose (not shown) and activates movement of the one or more pistons during vehicle braking through a sealed mechanical actuation mechanism (not shown) that amplifies the force between the actuator and the one or more pistons, as is known in the art.

Caliper 120 also includes an outboard pad seat (not shown) that is disposed opposite the one or more pistons. A pair of brake pads (not shown) are disposed within an opening 122 formed in caliper 120. Each one of a pair of opposing brake pads (not shown) includes friction material that is mounted on a backing plate (not shown). One of the pair of brake pads is seated outboard of disc portion 164 of rotor 160 within the outboard pad seat of caliper 120, and the other one of the pair of brake pads is seated inboard of the rotor disc portion in a generally rectangular cutout 216 formed in a torque plate 210 of brake assembly 115, with the torque plate being modified to accept first exemplary embodiment brake component positioning assembly 200, as described below. Each one of the pair of brake pads is positioned on a respective one of opposing sides of disc portion 164 of rotor 160 so that the friction material of each brake pad faces the disc portion. The brake pad inboard of the rotor disc portion 164 seats within cutout 216 of torque plate 210 adjacent the piston(s) of caliper 120 and the brake pad outboard of the rotor disc portion seats adjacent the outboard pad seat of the caliper.

Caliper 120 is formed with a pair of bosses 124 inboardly adjacent opening 122. Each one of the pair of bosses is formed with an opening 125 extending longitudinally through the boss. Caliper 120 is also formed with a lug 126 outboardly adjacent opening 122 and transversely aligned with bosses 124. During vehicle operation, a retainer clip (not shown) is disposed within lug 126 and extends transversely across opening 122 of caliper 120. The retainer clip is secured between bosses 124 via a pin (not shown) disposed through openings 125, or by other suitable means. In this manner, the retainer clip keeps the brake pads seated within caliper 120 during vehicle operation. Caliper 120 is slidably connected to torque plate 210, which will be described in detail below.

With reference to FIGS. 4-5, torque plate 210 is formed with a bore 212 extending transversely through the torque plate. Torque plate 210 is disposed on central tube 111 of axle 110 through bore 212 and is welded or otherwise rigidly attached to the central tube outboard of beam 112. Torque plate 210 is positioned radially on central tube 111 such that the actuator attached to caliper 120 extends inboardly from its attachment free of interference from beam 112. It is to be understood that torque plate 210 can be attached to central tube 111 at different radial positions on the central tube than shown without changing the overall concept or operation of the disclosed subject matter.

Torque plate 210 is formed with a pair of threaded openings 214. A counterbore (not shown) is formed on the inboard side of torque plate 210 around each one of pair of threaded openings 214. An inboardly extending hollow guide pin (not shown) is positioned within each counterbore, and in turn is attached to torque plate 210 via a socket head cap screw (not shown) disposed within the guide pin that engages threaded opening 214. Caliper 120 is formed with a pair of bores (not shown). A bushing (not shown) is press fit into each bore and is disposed on a respective guide pin, enabling caliper 120 to slidably engage the guide pins to allow transverse movement of the caliper relative to torque plate 210 in a known manner.

During vehicle travel, when air brake system 107 is engaged, compressed air flows to the actuator via the air hose. Actuation of the actuator causes outboard movement of the one or more pistons of caliper 120, which in turn forces the brake pad adjacent the one or more pistons outboardly against the inboard surface of disc portion 164 of rotor 160. As the brake pad adjacent the one or more pistons is forced against the inboard surface of disc portion 164 of rotor 160, because caliper 120 slidably engages torque plate 210 via the guide pins, the caliper is forced inboardly, which in turn forces the brake pad adjacent the outboard pad seat against the outboard surface of the rotor disc portion. In this manner, one of the brake pads reacts torque plate 210 and the other brake pad reacts caliper 120, and together, contact of the brake pads against the outboard and inboard surfaces of disc portion 164 of rotor 160 slows and/or stops rotation of the rotor, and thus slows and/or stops rotation of wheel hub 152 and the vehicle wheel.

In accordance with an important aspect of the disclosed subject matter, first exemplary embodiment brake component positioning assembly 200 enables positioning of braking components of brake assembly 115 away from wheel end assembly 150 during servicing and/or removal of wheel hub 152, rotor 160, and/or the guide pin bushings or other components of caliper 120. With reference to FIGS. 4-5, torque plate 210 is formed with generally rectangular cutout 216 positioned between pair of openings 214. Cutout 216 is disposed adjacent the piston(s) of caliper 120. During operation of the heavy-duty vehicle, because caliper 120 is slidably connected to torque plate 210 in the manner described above, upon actuation of the actuator during vehicle braking, the brake pad adjacent the one or more pistons positioned in cutout 216 reacts against the sides of cutout 216, creating braking reaction force via the one or more pistons without interference from the torque plate to provide vehicle braking in the manner described above.

In addition, torque plate 210 is modified to enable components of first exemplary embodiment brake component positioning assembly 200 to be mounted to the torque plate to enable caliper 120 and other associated components of brake assembly 115, such as the actuator, to be positioned away from wheel end assembly 150 during servicing and/or removal of wheel hub 152, rotor 160, and/or the guide pin bushings or other components of the caliper. More specifically, and with particular reference to FIG. 4, torque plate 210 is formed with a pair of vertically oriented openings 218 positioned longitudinally within cutout 216. Openings 218 are non-continuous and extend downwardly into torque plate 210. Openings 218 are non-continuous in that they extend only partially into torque plate 210. With reference to FIG. 5, first exemplary embodiment brake component positioning assembly 200 includes a pair of mounting pins 226. During operation of first exemplary embodiment brake component positioning assembly 200, an end of each one of mounting pins 226 is disposed within a respective one of openings 218, with each mounting pin extending upwardly from its respective opening.

First exemplary embodiment brake component positioning assembly 200 includes a base block or bottom block 222. Bottom block 222 is rectangular-shaped and corresponds with cutout 216 of torque plate 210. Bottom block 222 is formed with a pair of longitudinally spaced vertically oriented continuous openings 223. Openings 223 are continuous in that they extend entirely through bottom block 222. Pair of openings 223 are longitudinally aligned with pair of mounting pins 226. Each one of pair of openings 223 are disposed on a respective one of pair of mounting pins 226 such that bottom block 222 is disposed within and mates with cutout 216 of torque plate 210, with the upper end of each of the mounting pins extending upwardly from the bottom block. It is to be understood that bottom block 222 could have alternative shapes, such as an irregular shape, without affecting the overall concept or operation of the disclosed subject matter. With such alternative shapes, bottom block 222 preferably contacts or nearly contacts the sides of cutout 216 of torque plate 210 to provide longitudinal support to the bottom block during operation of first exemplary embodiment brake component positioning assembly 200.

First exemplary embodiment brake component positioning assembly 200 includes a positioning block or top lift block 224. Top lift block 224 is rectangular-shaped and is formed with a pair of longitudinally spaced vertically oriented continuous openings 225. Pair of openings 225 are longitudinally aligned with mounting pins 226. Each one of pair of openings 225 are disposed on a respective one of pair of mounting pins 226 such that top lift block 224 rests on top of and is vertically and longitudinally aligned with bottom block 222, with the upper end of each of the mounting pins extending upwardly from the top lift block. Top lift block 224 is formed with a transversely extending cutout or recess 227 at about the longitudinal centerline of the top lift block, the importance of which will be described below. Top lift block 224 is also formed with a threaded vertically oriented continuous central opening (not shown) positioned within recess 227. It is to be understood that top lift block 224 could have alternative shapes, such as an irregular shape, without affecting the overall concept or operation of the disclosed subject matter. It is also to be understood that first exemplary embodiment brake component positioning assembly 200 could utilize a single guide pin 226 disposed into one of pair of openings 218, or alternatively, a single opening, of torque plate 210, with top lift block 224 positioned on the guide pin to vertically and longitudinally align the top lift block with bottom block 222, without affecting the overall concept or operation of the disclosed subject matter.

During operation of first exemplary embodiment brake component positioning assembly 200, the retainer clip utilized to secure the brake pads within caliper 120 during vehicle operation is first removed from the caliper. The brake pads are subsequently removed from caliper 120 through opening 122. With reference to FIG. 5, once the brake pads have been removed, mounting pins 226, bottom block 222, and top lift block 224 are installed on torque plate 210 in the manner described above.

With reference to FIG. 3, first exemplary embodiment brake component positioning assembly 200 includes a lift retainer 228, which is utilized to connect caliper 120 to top lift block 224 of the first exemplary embodiment brake component positioning assembly. More specifically, lift retainer 228 is disposed within lug 126 of caliper 120 and extends transversely across opening 122 of the caliper so that it seats within recess 227 (FIG. 5) of top lift block 224. Lift retainer 228 is secured between bosses 124 of caliper 120 via a retainer pin 221 disposed through openings 125 of the pair of bosses (FIGS. 6-7). It is to be understood that lift retainer 228 can be secured to caliper 120 by alternative means, such as via a fastener, without affecting the overall concept or operation of the disclosed subject matter. It is also to be understood that lift retainer 228 can include a different structure than that shown to connect top lift block 224 to a caliper with a different structure than caliper 120 without affecting the overall concept or operation of the disclosed subject matter. Lift retainer 228 is formed with an opening 229 that is vertically aligned with the threaded central opening of top lift block 224. It is to be understood that lift retainer 228 could be rigidly attached to top lift block 224 by any suitable means, such as fasteners or welds, to aid in stability of first exemplary embodiment brake component positioning assembly 200 during operation without affecting the overall concept or operation of the disclosed subject matter.

With reference to FIGS. 5-7, first exemplary embodiment brake component positioning assembly 200 includes a lift screw 230. Lift screw 230 is threadably engagable with the threaded central opening of top lift block 224. With particular reference to FIG. 7, as lift screw 230 is rotated clockwise, the lift screw is threaded downwardly through the threaded central opening of top lift block 224 and contacts the top surface of bottom block 222. Once lift screw 230 contacts the top surface of bottom block 222 and is continued to be rotated clockwise, because top lift block 224 is disposed about mounting pins 226 via openings 225, top lift block 224 is forced upwardly away from bottom block 222 along the mounting pins. Because caliper 120 is removably connected to first exemplary embodiment brake component positioning assembly 200 in the manner described above, when the caliper guide pins are detached from torque plate 210, the caliper is also forced away from bottom block 222 when lift screw 230 is rotated clockwise, and thus can be positioned away from wheel end assembly 150, and thus wheel hub 152 and rotor 160.

Alternatively, top lift block 224 and bottom block 222 could be replaced with a single lift block (not shown) which includes a threaded central opening for threadably receiving lift screw 230 and is disposed on pair of mounting pins 226 through openings formed in the single lift block. As lift screw 230 is rotated clockwise, the lift screw is threaded downwardly through the threaded central opening of the single lift block and contacts the top surface of torque plate 210 within cutout 216. Once lift screw 230 contacts the top surface of torque plate 210 within cutout 216 and is continued to be rotated clockwise, because the single lift block is disposed on mounting pins 226 through its openings, the single lift block is forced away from the torque plate along the mounting pins. Because caliper 120 is removably connected to first exemplary embodiment brake component positioning assembly 200 in the manner described above, when the caliper guide pins are detached from torque plate 210, the caliper is also forced away from torques plate 210 with the single lift block, and thus can be positioned away from wheel end assembly 150, and thus wheel hub 152 and rotor 160.

In this manner, first exemplary embodiment brake component positioning assembly 200 of the disclosed subject matter enables caliper 120 and other associated components of brake assembly 115, such as the actuator, to be positioned away from wheel hub 152 and rotor 160 to facilitate servicing and/or removal of the wheel hub, rotor, and/or guide pin bushings without requiring removal of the air tube from the actuator or the actuator from the caliper, and manual removal of the caliper and associated brake assembly components from the wheel end, or requiring use of a discrete crane. In addition, because top lift block 224 is disposed on mounting pins 226 in accordance with the above description, first exemplary embodiment brake component positioning assembly 200 enables accurate alignment of the caliper guide pins with pair of openings 214 of torque plate 210 during reattachment of the caliper to the torque plate after servicing and/or reattachment of wheel hub 152, rotor 160, and/or the caliper guide pin bushings or other components of the caliper. Therefore, first exemplary embodiment brake component positioning assembly 200 of the disclosed subject matter provides a more service friendly mechanism for servicing/removing components of the wheel end assembly and/or caliper and minimizes the potential for contaminants to be introduced into the brake air hoses or caliper during servicing and/or removal of the components.

A second exemplary embodiment brake component positioning structure or assembly for heavy-duty vehicles of the disclosed subject matter is shown in FIGS. 8-12, and is indicated generally at 300. Second exemplary embodiment brake component positioning assembly 300 is utilized with heavy-duty vehicle axle/suspension systems, and is shown used in conjunction with axle/suspension system 105 incorporating a pair of trailing arm beams 172 similar to pair of training arm beams 12 (FIGS. 1-2). Second exemplary embodiment brake component positioning assembly 300 functions similarly to first exemplary embodiment brake component positioning assembly 200, but includes a structure which enables the second exemplary embodiment brake component positioning assembly to be utilized with brake assemblies in which the caliper is positioned radially downwardly from the axle/suspension system beam, as will be described below.

Components of second exemplary embodiment brake component positioning assembly 300 are removably fixedly attachable to a torque plate 310 (FIG. 9) of brake assembly 115, as described below. Torque plate 310 is formed with a bore 312 extending transversely through the torque plate. Torque plate 310 is disposed on central tube 111 of axle 110 through bore 312, and is welded or otherwise rigidly attached to the central tube outboard of beam 172. Torque plate 310 is positioned radially on central tube 111 such that the actuator attached to caliper 120 extends inboardly from its attachment free of interference from beam 172. It is to be understood that torque plate 310 can be attached to central tube 111 at different radial positions on the central tube without changing the overall concept or operation of the disclosed subject matter.

Figure 9:
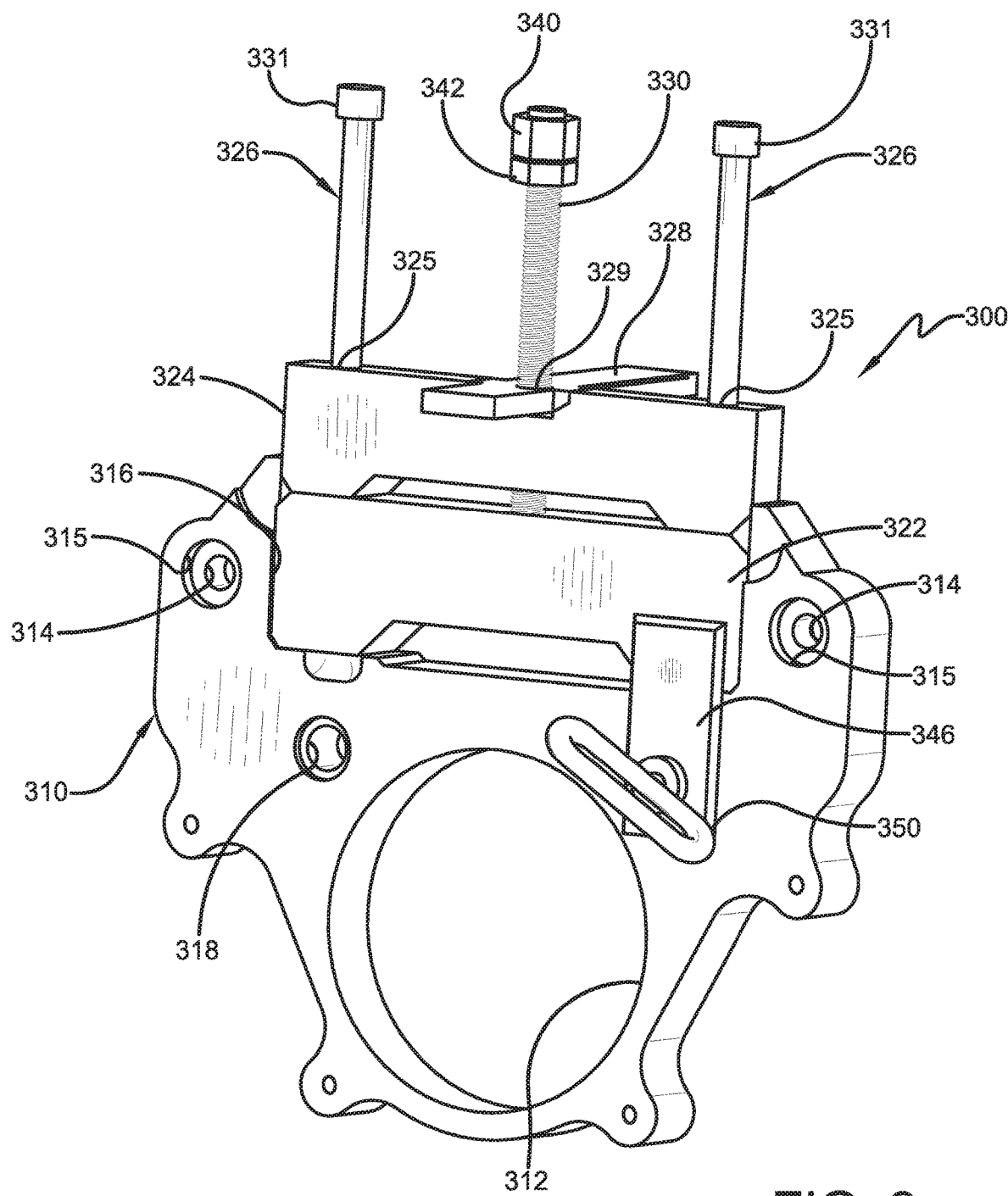
FIG. 9 is a passenger side perspective view of the second exemplary embodiment brake component positioning assembly of FIG. 8, removed from the axle/suspension system.

Torque plate 310 facilitates slidable connection of caliper 120 to the torque plate. More specifically, torque plate 310 is formed with a pair of threaded openings 314. With reference to FIG. 9, a counterbore 315 is formed on the inboard side of torque plate 310 around each one of pair of threaded openings 314. An inboardly extending hollow guide pin (not shown) is positioned within each counterbore 315, and in turn is attached to torque plate 310 via a socket head cap screw (not shown) disposed within the guide pin that engages threaded opening 314. Each bushing (not shown) of caliper 120 is disposed on respective guide pin, enabling caliper 120 to slidably engage the guide pins to allow transverse movement of the caliper relative to torque plate 310 in a known manner.

Torque plate 310 is formed with a generally rectangular cutout 316 positioned between pair of openings 314. Cutout 316 is disposed adjacent the piston(s) of caliper 120. During operation of the heavy-duty vehicle, one of the pair of brake pads of brake assembly 115 is seated within cutout 316 of torque plate 310. Because caliper 120 is slidably connected to torque plate 310, upon actuation of the actuator during vehicle braking, the brake pad adjacent the one or more pistons seated in cutout 316 reacts against the sides of the cutout, creating braking reaction force via the one or more pistons without interference from the torque plate to provide vehicle braking in the manner described above.

Second exemplary embodiment brake component positioning assembly 300 enables positioning of braking components of brake assembly 115 away from wheel end assembly 150 during servicing and/or removal of wheel hub 152, rotor 160, and/or guide pin bushings or other components of caliper 120. More specifically, components of second exemplary embodiment brake component positioning assembly 300 can be removably fixedly attached to torque plate 310 to enable caliper 120 and associated components of brake assembly 115, such as the actuator, to be positioned away from wheel end assembly 150 during servicing and/or removal of wheel hub 152, rotor 160, and/or guide pin bushings or other components of the caliper.

Figure 10:
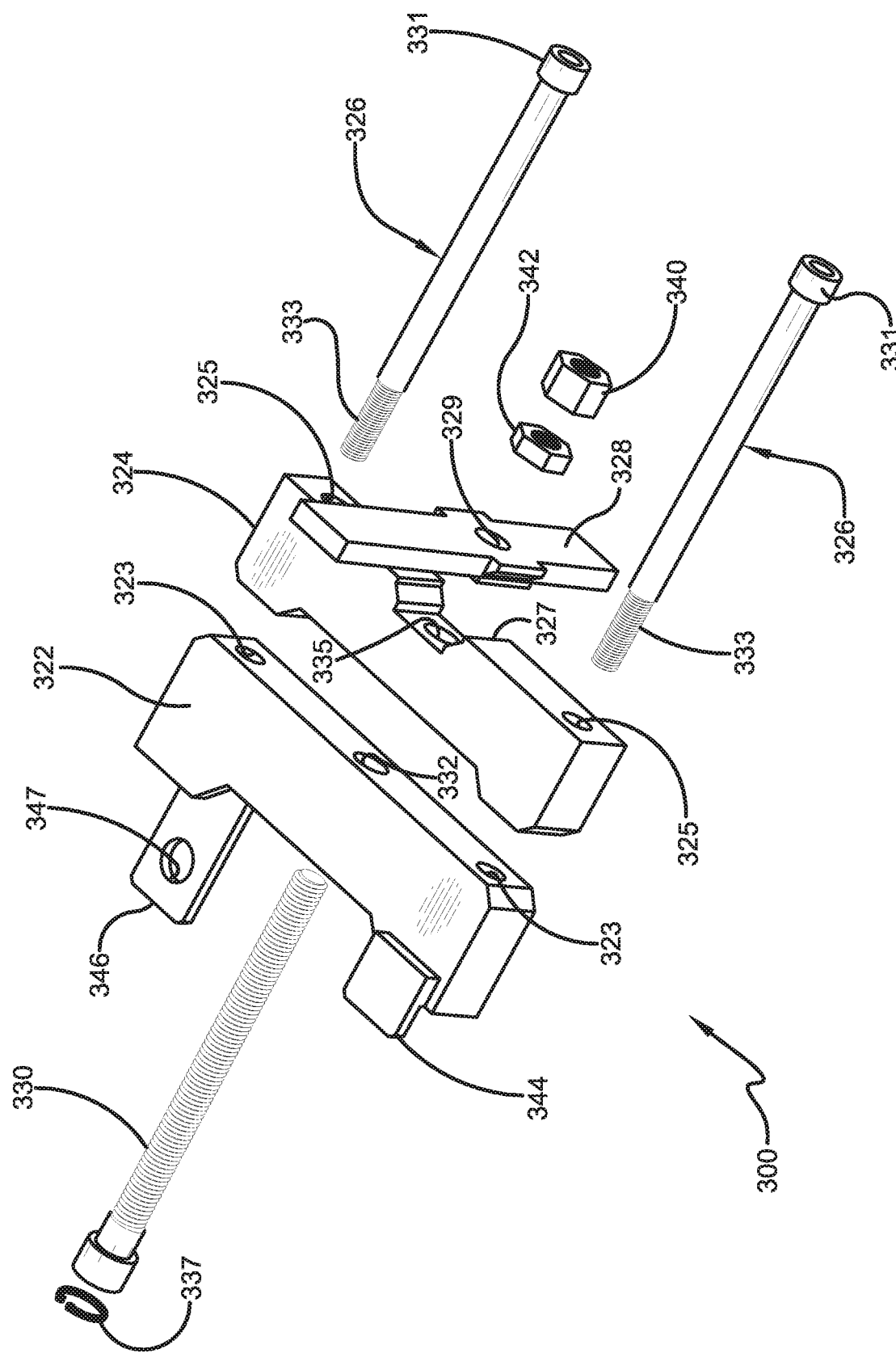
FIG. 10 is an exploded view of selected components of the second exemplary embodiment brake component positioning assembly of FIG. 8.

Second exemplary embodiment brake component positioning assembly 300 includes a base block 322. Base block 322 is generally rectangular inverted U-shaped and corresponds generally with cutout 316 of torque plate 310. With reference to FIG. 10, base block 322 is formed with a pair of longitudinally spaced vertically oriented non-continuous threaded openings 323. Base block 322 is formed with a vertically oriented continuous opening 332 located at about the longitudinal centerline of the bottom block, the importance of which will be described below. Base block 322 is formed with a first support projection 344. First support projection 344 extends downwardly from the outboard surface of base block 322. Because rotor 160 is positioned outboardly adjacent torque plate 310, the transverse thickness of first support projection 344 is limited by the transverse clearance between the torque plate and the rotor. A relief (not shown) which corresponds to first support projection 344 can be formed or machined in the outboard surface of torque plate 310 to enable the transverse thickness of the first support projection 344 to be increased.

With reference to FIGS. 9-10, base block 322 is also formed with a second support projection 346. Second support projection 346 extends downwardly from the inboard surface of base block 322 such that the second support projection is located transversely and diagonally from first support projection 344 on the base block. When base block 322 is positioned within cutout 316 of torque plate 310, first support projection 344 and second support projection 346 are positioned on and closely adjacent to the outboard and inboard facing surfaces of the torque plate, respectively, and provide lateral support to base block 322 to align and position the base block within cutout 316 of torque plate 310. With reference to FIG. 10, second support projection 346 is formed with an opening 347, the importance of which will be described in detail below. It is to be understood that base block 322 could have alternative shapes, such as an irregular shape, without affecting the overall concept or operation of the disclosed subject matter. With such alternative shapes, base block 322 preferably contacts or nearly contacts the sides of cutout 316 of torque plate 310 to provide longitudinal support to the base block during operation of second exemplary embodiment brake component positioning assembly 300.

Second exemplary embodiment brake component positioning assembly 300 includes a positioning block 324. Positioning block 324 is generally rectangular inverted U-shaped and is formed with a pair of longitudinally spaced vertically oriented continuous openings 325. Each one of pair of openings 325 is longitudinally aligned with a respective one of pair of openings 323 of base block 322. With reference to FIG. 10, positioning block 324 is formed with a transversely extending cutout or recess 327 at about the longitudinal centerline of the positioning block, the importance of which will be described below. Positioning block 324 is also formed with a threaded vertically oriented continuous central opening 335 positioned within recess 327. It is to be understood that top positioning block 334 could have an alternative shape than that shown, such as an irregular shape, without affecting the overall concept or operation of the disclosed subject matter.

Second exemplary embodiment brake component positioning assembly 300 includes a pair of guide pins 326. Each one of pair of guide pins 326 includes a threaded end 333 and a socketed head 331 opposite the threaded end. A respective one of pair of guide pins 326 is disposed through each one of pair of openings 325 of positioning block 324. Threaded end 333 of each guide pin 326 threadably engages a respective one of pair of openings 323 of base block 322. Positioning block 324 is positioned on pair of guide pins 326 such that the bottom of each one of the longitudinal ends of the positioning block contacts the top of respective ones of the longitudinal ends of base block 322 and is vertically and longitudinally aligned with the base block. Each guide pin 326 extends from a respective opening 325 of positioning block 324. It is to be understood that second exemplary embodiment brake component positioning assembly 300 could utilize a single guide pin 326 disposed into and threadably engaging one of pair of openings 323, or a single opening, with positioning block 324 positioned on the guide pin to vertically and longitudinally align the positioning block with base block 322, without affecting the overall concept or operation of the disclosed subject matter.

During operation of second exemplary embodiment brake component positioning assembly 300, the retainer clip utilized to secure the brake pads within caliper 120 during vehicle operation is first removed from the caliper. The brake pads are subsequently removed from caliper 120 through opening 122. With reference to FIG. 9, once the brake pads have been removed, guide pins 326, base block 322, and positioning block 324 are installed on torque plate 310 in the manner described above.

With reference to FIG. 8, second exemplary embodiment brake component positioning assembly 300 includes a retainer 328 utilized to connect caliper 120 to positioning block 324 of the second exemplary embodiment brake component positioning assembly. More specifically, retainer 328 is disposed within lug 126 of caliper 120 and extends transversely across opening 122 of the caliper so that it seats within recess 327 of positioning block 324. Retainer 328 is secured between bosses 124 of caliper 120 via a retainer pin 321 disposed through openings 125 of the pair of bosses (FIGS. 11-12). Retainer 328 is rigidly attached to top lift block 324 within recess 327 by any suitable means, such as fasteners (not shown) or welds (not shown), which aids in stability of second exemplary embodiment brake component positioning assembly 300 during operation and/or prevents the retainer and attached caliper 120 from falling downwardly uncontrollably from the positioning block 324 when the caliper is positioned radially downwardly from beam 172 of axle/suspension system 105. It is to be understood that retainer 328 can be secured to caliper 120 by alternative means, such as with a fastener, without affecting the overall concept or operation of the disclosed subject matter. It is also to be understood that retainer 328 can include a different structure than that shown to connect positioning block 324 to a caliper with a different structure than caliper 120 without affecting the overall concept or operation of the disclosed subject matter. Retainer 328 is formed with an opening 329 that is aligned with the threaded central opening 335 of positioning block 324.

With reference to FIGS. 8-12, second exemplary embodiment brake component positioning assembly 300 includes a positioning bolt 330. Positioning bolt 330 is disposed through opening 332 of base block 322 and is threaded through threaded central opening 335 of positioning block 324 such that the positioning block rests on the base block. Positioning bolt 330 is secured within the bottom of opening 332 with a retaining clip 337 and extends upwardly from positioning block 324 through retainer 328. A nut 340 is locked against a counter-nut 342 threaded on positioning bolt 330 in a manner known in the art, such that positioning bolt 330 can be rotated within opening 332 of base block 322.

With particular reference to FIG. 12, as positioning bolt 330 is rotated clockwise, the positioning bolt is rotated within opening 332 of base block 322. Because positioning bolt 330 threadably engages threaded central opening 335 of positioning block 324, as the lift screw is rotated clockwise via nut 340, positioning block 324 is forced away from base block 322 on guide pins 326. More specifically, because positioning block 324 is disposed about guide pins 326 via openings 325, positioning block 324 is forced away from base block 322 along the guide pins. Because caliper 120 is removably connected to second exemplary embodiment brake component positioning assembly 300 in the manner described above, when the caliper guide pins are detached from torque plate 310, the caliper is also forced away from base block 322, and thus can be positioned away from wheel end assembly 150, and thus wheel hub 152 and rotor 160.

In this manner, second exemplary embodiment brake component positioning assembly 300 of the disclosed subject matter enables caliper 120 and its associated components of brake assembly 115, such as the actuator, to be positioned away from wheel hub 152 and rotor 160 to facilitate servicing and/or removal of the wheel hub, rotor, and/or guide pin bushings or other components of the caliper without requiring removal of the air tube from the actuator and manual removal of the caliper and associated brake assembly components from the wheel end, or requiring use of a discrete crane. In addition, because positioning block 324 is disposed on mounting pins 326 in accordance with the above disclosure, second exemplary embodiment brake component positioning assembly 300 enables accurate alignment of the guide pins of caliper 120 with pair of openings 314 of torque plate 310 during reattachment of the caliper to the torque plate after servicing and/or reattachment of wheel hub 152, rotor 160, and/or the guide pin bushings or other components of the caliper.

In accordance with an important aspect of second exemplary embodiment brake component positioning assembly 300, the second exemplary embodiment brake component positioning assembly includes a means to lock base block 322 to torque plate 310 to enable the second exemplary embodiment brake component positioning assembly to be utilized with axle/suspension systems with brake assemblies in which the caliper is positioned radially downwardly from the axle/suspension system beam, such as axle/suspension systems incorporating trailing arm beams similar to beam 272.

With reference to FIG. 9, torque plate 310 is formed with a pair of longitudinally aligned transverse openings 318 positioned below cutout 316. During operation of a heavy-duty vehicle incorporating axle/suspension system 105, openings 318 facilitate attachment of an antilock braking system (ABS) sensor utilized in conjunction with a vehicle ABS system of a type known in the art. Typically only a single ABS sensor is utilized with the vehicle ABS system. Consequently, an ABS sensor is typically mounted in only one of openings 318 during vehicle operation, with the other opening being free of interference from the ABS sensor. When it is desired to position caliper 120 and associated components of brake assembly 115 away from wheel end assembly 150 during servicing and/or removal of wheel hub 152, rotor 160, and/or the guide pin bushings or other components of the caliper, openings 318 facilitate attachment of components of second exemplary embodiment brake component positioning assembly 300. More specifically, base block 322 is seated within cutout 316 of torque plate 310 such that opening 347 of second support projection 346 aligns with opening 318 of the torque plate that does not house the ABS senor. A quick-connect pin 350 is inserted through opening 347 of second support projection 346 and aligned torque plate opening 318, and removeably locks base block 322 within cutout 316 of torque plate 310.

Because guide pins 326 are secured within openings 323 of base block 322 and include socketed heads 331, second exemplary embodiment brake component positioning assembly 300 is prevented from being detached from or falling off of torque plate 310, and thus the vehicle wheel end due to gravity when caliper 120 is positioned radially downwardly from beam 172 of axle/suspension system 105. Alternatively, base block 322 can be secured to torque plate 310 utilizing alternative means without affecting the overall concept or operation of the disclosed subject matter. For example, openings 318 could be threaded, with base block 322 being secured to torque plate 310 via a bolt disposed through opening 347 of second support projection 346 and threadably engaging the torque plate opening. Thus, caliper 120 and its associated components of brake assembly 115, such as the actuator, can be positioned away from wheel hub 152 and rotor 160 to facilitate servicing and/or removal of the wheel hub, rotor, and/or guide pin bushings or other components of the caliper, in configurations of axle/suspension system 105 in which the caliper is positioned radially downwardly from beam 172.

Therefore, second exemplary embodiment brake component positioning assembly 300 of the disclosed subject matter provides a more service friendly mechanism for servicing/removing components of the wheel end assembly and/or caliper and minimizes the potential for contaminants to be introduced into the brake air hoses and/or caliper during servicing and/or removal of the components. Additionally, second exemplary embodiment brake component positioning assembly 300 can be utilized on axle/suspension systems with brake assembly configuration in which the caliper is angled below the axle/suspension beams.

The disclosed subject matter also includes a method of installing first exemplary embodiment brake component positioning assembly 200 into a heavy-duty vehicle axle/suspension system and removing or moving one or more components of a heavy-duty vehicle brake assembly using the first exemplary embodiment brake component positioning assembly. The method includes steps in accordance with the description that is presented above and shown in FIGS. 3-7. The disclosed subject matter also includes a method of installing second exemplary embodiment brake component positioning assembly 300 into a heavy-duty vehicle axle/suspension system and removing or moving one or more components of a heavy-duty vehicle brake assembly using the second exemplary embodiment brake component positioning assembly. The method includes steps in accordance with the description that is presented above and shown in FIGS. 8-12.

It is to be understood that the structure and arrangement of the above-described brake component positioning assembly 200, 300 for heavy-duty vehicles of the disclosed subject matter may be altered or rearranged without affecting the overall concept or operation of the disclosed subject matter. For instance, brake component positioning assembly 200, 300 could be attached to or integrated with axle 110 or other heavy-duty vehicle structure, and be used to position caliper 120 and associated brake assembly components away from wheel end assembly 150 utilizing cantilevered means. In another example, brake component positioning assembly 200, 300 could be adapted to lift/position other components of the heavy-duty axle/suspension system away from wheel end assembly 150 without affecting the overall concept or operation of the disclosed subject matter. Brake component positioning assembly 200, 300 for heavy-duty vehicles of the disclosed subject matter may be employed with other types of axles, wheel end assemblies, axle/suspension systems, and/or brake systems than those shown and described above, including brake systems employing carriers, without affecting the overall concept or operation of the disclosed subject matter. For example, brake component positioning assembly 200, 300 can be used on steerable and non-steerable axles, and on drive and non-drive axles, without affecting the overall concept or operation of the disclosed subject matter. Brake component positioning assembly 200, 300 could also be used on axle/suspension systems with beams including different structures than those shown, such as those with top mount or bottom mount underslung beams, top mount or bottom mount overslung beams, and pass-through underslung or overslung beams, without affecting the overall concept or operation of the disclosed subject matter. Moreover, while reference herein has been made generally to a heavy-duty vehicle for the purpose of convenience, it has been with the understanding that such reference includes trucks, tractor-trailers and semi-trailers, and trailers thereof.

The disclosed subject matter has been described with reference to specific embodiments. It is understood that this description and illustration is by way of example and not by way of limitation. Potential modifications and alterations will occur to others upon a reading and understanding of this disclosure, and it is understood that the disclosed subject matter includes all such modifications and alterations and equivalents thereof.

What is claimed is:

1. A brake component positioning structure for a heavy-duty vehicle comprising:
    a positioning assembly, said positioning assembly being installed on and supported by said heavy-duty vehicle, the positioning assembly enabling a brake system component to be moved away from a wheel end of the heavy-duty vehicle when said positioning assembly is installed on and supported by said heavy-duty vehicle to allow servicing of the brake system component or to allow removal or servicing of another component of the heavy-duty vehicle without removing said brake system component from said wheel end, the positioning assembly being removed from said heavy-duty vehicle before operation of the heavy-duty vehicle.

2. The brake component positioning structure for a heavy-duty vehicle of claim 1, wherein said positioning assembly is installed on and supported by a torque plate.

3. The brake component positioning structure for a heavy-duty vehicle of claim 2, wherein said torque plate is rigidly attached to an axle of said heavy-duty vehicle and enables operable attachment of a caliper, the torque plate including a cutout, said positioning assembly further comprising:
    at least one guide pin disposed within an opening formed in said cutout;
    a positioning block, said positioning block including at least one continuous opening, said continuous opening being disposed on and slidably engaging said at least one guide pin, the positioning block being removably connected to said brake system component;
    a positioning bolt, said positioning bolt threadably engaging a threaded opening formed in said positioning block, whereby rotation of the positioning bolt slidably moves the positioning block and the brake system component away from the cutout to position said brake system component away from said wheel end.

4. The brake component positioning structure for a heavy-duty vehicle of claim 3, wherein said brake system component is said caliper.

5. The brake component positioning structure for a heavy-duty vehicle of claim 3, wherein said positioning assembly includes a pair of guide pins, each one of said pair of guide pins being disposed through a respective one of a pair of openings formed in said cutout, said positing block including a pair of continuous openings, each one of said pair of continuous openings being disposed on a respective one of said pair of guide pins to slidably engage the guide pins.

6. The brake component positioning structure for a heavy-duty vehicle of claim 3, wherein said positioning block includes:
 a bottom block, said continuous opening extending through said bottom block, the bottom block being disposed on said at least one guide pin within said cutout; and
 a top block, the continuous opening extending through said top block and being disposed on and slidably engaging the at least one guide pin, said threaded opening extending through the top block, said brake system component being removably connected to said top block, said positioning bolt threadably engaging the threaded opening so that the positioning bolt contacts said bottom block, whereby rotation of said positioning bolt slidably moves said top block and the brake system component away from said bottom block to position said brake system component away from said wheel end.

7. The brake component positioning structure for heavy-duty vehicles of claim 2, wherein said torque plate is rigidly attached to an axle of said heavy-duty vehicle and enables operable attachment of a caliper, said torque plate including a cutout, said positioning assembly further comprising:
 a bottom block, said bottom block being disposed within said cutout and including a continuous opening, the bottom block being removably attached to the torque plate;
 a positioning block, said positioning block including at least one continuous opening and a threaded opening, said threaded opening being aligned with said bottom block continuous opening, said positioning block being removably connected to said brake system component;
 at least one guide pin, said at least one guide pin being disposed through said at least one continuous opening of the positioning block and being removably attached to said bottom block, said positioning block slidably engaging the at least one guide pin;
 a positioning bolt, said positioning bolt being disposed through and rotatably retained within said continuous opening of the bottom block, the positioning bolt threadably engaging the threaded opening of the positioning block, whereby rotation of said positioning bolt slidably moves said positioning block and said brake system component away from the cutout to position the brake system component away from said wheel end.

8. The brake component positioning structure for a heavy-duty vehicle of claim 7, wherein said cutout is rectangular shaped.

9. The brake component positioning structure for a heavy-duty vehicle of claim 7, wherein said bottom block is formed with a first support projection, said first support projection extending adjacent said torque plate and including an opening, said opening being aligned with a corresponding opening formed in the torque plate, the bottom block being removably secured to said torque plate via a fastener disposed through said first support projection opening and said aligned torque plate opening.

10. The brake component positioning structure for a heavy-duty vehicle of claim 9, wherein said fastener is a quick-connect pin.

11. The brake component positioning structure for a heavy-duty vehicle of claim 9, wherein said bottom block is formed with a second support projection, said second support projection extending adjacent said torque plate on a side of the torque plate opposite said first support projection, the first support projection and the second support projection providing lateral support to said bottom block to align and position the bottom block within said cutout.

12. The brake component positioning structure for a heavy-duty vehicle of claim 11, wherein said first support projection is located diagonally opposite said second support projection on said bottom block.

13. The brake component positioning structure for a heavy-duty vehicle of claim 7, wherein said brake system component is said caliper, said positioning assembly further including a retainer, said retainer being rigidly attached to or integrally formed with said positioning block and including an opening aligned with said at least one threaded opening of the positioning block, the retainer being removably connected to the caliper to removably connect said caliper to the positioning block.

14. The brake component positioning structure for a heavy-duty vehicle of claim 13, wherein said retainer is disposed within a corresponding recess formed in said positioning block.

15. The brake component positioning structure for a heavy-duty vehicle of claim 13, wherein said retainer is disposed within a lug of said caliper and is removably connected to the caliper via a retainer pin.

16. The brake component positioning structure for a heavy-duty vehicle of claim 7, wherein said at least one guide pin includes a socketed head on an end opposite said base block.

17. The brake component positioning structure for a heavy-duty vehicle of claim 7, wherein said positioning assembly includes a pair of guide pins, each one of said pair of guide pins being disposed through a respective one of a pair of continuous openings formed in said positioning block and being removably attached to said bottom block, the positioning block slidably engaging said pair of guide pins.

18. The brake component positioning structure for a heavy-duty vehicle of claim 7, wherein said positioning bolt is rotatably retained in said continuous opening of said bottom block with a retainer clip.

19. The brake component positioning structure for a heavy-duty vehicle of claim 18, wherein said positioning bolt includes a nut locked on the positioning bolt with a counter-nut, said nut enabling said positioning bolt to be rotated within said continuous opening of said base block.

20. The brake component positioning structure for a heavy-duty vehicle of claim 7, wherein said at least one guide pins includes a threaded end, said threaded end threadably engaging said bottom block to removably attach the at least one guide pin to the bottom block.

21. The brake component positioning structure for a heavy-duty vehicle of claim 1, wherein said positioning assembly is installed on and supported by an axle of said heavy-duty vehicle.

22. A brake component positioning structure for a heavy-duty vehicle comprising:
 a positioning assembly, said positioning assembly being removably connectable to a torque plate of said heavy-duty vehicle, said torque plate being rigidly attached to an axle of the heavy-duty vehicle and enabling operable attachment of a caliper, the torque plate including a cutout, the positioning assembly including:

at least one guide pin disposed within an opening formed in said cutout;

a positioning block, said positioning block including at least one continuous opening, said continuous opening being disposed on and slidably engaging said at least one guide pin, the positioning block being removably connectable to a brake system component of a vehicle brake system;

a positioning bolt, said positioning bolt threadably engaging a threaded opening formed in said positioning block, whereby rotation of the positioning bolt slidably moves the positioning block and said brake system component away from the cutout to position the brake system component away from a wheel end of said heavy-duty vehicle to allow removal or servicing of at least one component of a wheel end assembly or said vehicle brake system.

23. A brake component positioning structure for a heavy-duty vehicle comprising:

a positioning assembly, said positioning assembly being removably connectable to a torque plate of said heavy-duty vehicle, said torque plate being rigidly attached to an axle of the heavy-duty vehicle and enabling operable attachment of a caliper, the torque plate including a cutout, the positioning assembly including:

a bottom block, said bottom block being disposed within said cutout and including a continuous opening, the bottom block being removably attached to the torque plate;

a positioning block, said positioning block including at least one continuous opening and a threaded opening, said threaded opening being aligned with said bottom block continuous opening, said positioning block being removably connectable to a brake system component of a vehicle brake system;

at least one guide pin, said at least one guide pin being disposed through said at least one continuous opening of the positioning block and being removably attached to said bottom block, said positioning block slidably engaging the at least one guide pin;

a positioning bolt, said positioning bolt being disposed through and rotatably retained within said continuous opening of the bottom block, the positioning bolt threadably engaging the threaded opening of the positioning block, whereby rotation of said positioning bolt slidably moves said positioning block and said brake system component away from the cutout to position the brake system component away from a wheel end of said heavy-duty vehicle to allow removal or servicing of at least one component of a wheel end assembly or said vehicle brake system.

\* \* \* \* \*